United States Patent [19]

Nakata et al.

[11] Patent Number: 5,434,383
[45] Date of Patent: Jul. 18, 1995

[54] PIERCING METHOD FOR LASER PROCESSING

[75] Inventors: Yoshinori Nakata, Oshino; Norio Karube, Machida; Etsuo Yamazaki, Kitatsuru, all of Japan

[73] Assignee: Fanuc Ltd., Yamanashi, Japan

[21] Appl. No.: 75,580

[22] PCT Filed: Oct. 9, 1992

[86] PCT No.: PCT/JP92/01311

§ 371 Date: Jun. 16, 1993

§ 102(e) Date: Jun. 16, 1993

[87] PCT Pub. No.: WO93/07987

PCT Pub. Date: Apr. 29, 1993

[30] Foreign Application Priority Data

Oct. 19, 1991 [JP] Japan .................. 3-297811

[51] Int. Cl.$^6$ .............................. B23K 26/00
[52] U.S. Cl. ................ 219/121.71; 219/121.7; 219/121.85; 219/121.61
[58] Field of Search ......... 219/121.7, 121.71, 121.61, 219/121.85

[56] References Cited

U.S. PATENT DOCUMENTS 5,012,069 4/1991 Arai .................. 219/121.62

FOREIGN PATENT DOCUMENTS 0305533 3/1989 European Pat. Off. .
3-230884 10/1991 Japan .
2218660 11/1989 United Kingdom .
86/02301 4/1986 WIPO .

*Primary Examiner*—Mark H. Paschall
*Attorney, Agent, or Firm*—Staas & Halsey

[57] ABSTRACT

A piercing method using a laser, in which the processing time is made shorter; a thermal runaway is prevented; and dispersion of the processing time is made smaller. According to this method, piercing operation is started with an initial pulse frequency $P_0$ and an initial pulse duty ratio $Q_0$, and the pulse frequency and the pulse duty ratio are increased by increments P and Q, respectively, with every passage of a predetermined time T. The pulse frequency and the pulse duty ratio are increased by stages. After this increase is repeated a predetermined number of times, or after the passage of a predetermined time from the start of processing, processing is continued to the end maintaining the increased values. This piercing method enables the processing time to be reduced to $\frac{1}{3}$ to 1/5, as compared with the conventional method. In addition, this method prevents a thermal runaway, and reduces the dispersion of the processing time.

12 Claims, 31 Drawing Sheets

| | |
|---|---|
| LASER OSCILLATOR | C2000 |
| PEAK OUTPUT | 2500W |
| WORKPIECE THICKNESS | 12.0mm |
| PULSE DUTY RATIO INCREMENT P | 5 hz |
| PULSE DUTY RATIO INCREMENT | 1 % |
| INITIAL PULSE FREQUENCY $P_0$ | 10 hz |
| INITIAL PULSE DUTY RATIO $Q_0$ | CHANGE |
| TIME DURATION T | 500msec |

| | | |
|---|---|---|
| LASER OSCILLATOR | ; | C2000 |
| PEAK OUTPUT | ; | 2500W |
| WORKPIECE THICKNESS | ; | 12.0mm |
| PULSE DUTY RATIO INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DUTY RATIO $Q_O$ | ; | CHANGE |
| TIME DURATION T | ; | 500msec |

| | | |
|---|---|---|
| LASER OSCILLATOR | ; | C2000 |
| PEAK OUTPUT | ; | 2500W |
| WORKPIECE THICKNESS | ; | 12.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 50 hz |
| INITIAL PULSE DUTY RATIO $Q_O$ | ; | CHANGE |
| TIME DURATION T | ; | 500msec |

| | | |
|---|---|---|
| LASER OSCILLATOR | ; | C3000 |
| PEAK OUTPUT | ; | 3500W |
| WORKPIECE THICKNESS | ; | 12.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 5 hz |
| INITIAL PULSE DUTY RATIO $Q_O$ | ; | CHANGE |
| TIME DURATION T | ; | 500msec |

| | | |
|---|---|---|
| LASER OSCILLATOR | ; | C3000 |
| PEAK OUTPUT | ; | 3500W |
| WORKPIECE THICKNESS | ; | 12.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DUTY RATIO $Q_O$ | ; | CHANGE |
| TIME DURATION T | ; | 500msec |

| | | |
|---|---|---|
| LASER OSCILLATOR | ; | C3000 |
| PEAK OUTPUT | ; | 3500W |
| WORKPIECE THICKNESS | ; | 16.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DUTY RATION $Q_O$ | ; | CHANGE |
| TIME DURATION T | ; | 500msec |

| | | |
|---|---|---|
| LASER OSCILLATOR | ; | C3000 |
| PEAK OUTPUT | ; | 3500W |
| WORKPIECE THICKNESS | ; | 16.0mm |
| PULSE FREQUENCY INCREMENT P | ; | 5 hz |
| PULSE DUTY RATIO INCREMENT | ; | 1 % |
| INITIAL PULSE FREQUENCY $\beta_0$ | ; | 5 hz |
| INITIAL PULSE DUTY RATIO $Q_0$ | ; | CHANGE |
| TIME DURATION T | ; | 500msec |

| | | |
|---|---|---|
| LASER OSCILLATOR | ; | C3000 |
| PEAK OUTPUT | ; | 3500W |
| WORKPIECE THICKNESS | ; | 12.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DUTY RATIO $Q_O$ | ; | 15 % |
| TIME DURATION T | ; | 200msec |

| | | |
|---|---|---|
| LASER OSCILLATOR | ; | C3000 |
| PEAK OUTPUT | ; | 3500W |
| WORKPIECE THICKNESS | ; | 12.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DUTY RATIO $Q_O$ | ; | 15 % |
| TIME DURATION T | ; | 300msec |

| | | |
|---|---|---|
| LASER OSCILLATOR | ; | C3000 |
| PEAK OUTPUT | ; | 3500W |
| WORKPIECE THICKNESS | ; | 12.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DURY RATIO $Q_O$ | ; | 15 % |
| TIME DURATION T | ; | 400msec |

| | | |
|---|---|---|
| LASER OSCILLATOR | ; | C3000 |
| PEAK OUTPUT | ; | 3500W |
| WORKPIECE THICKNESS | ; | 12.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DUTY RATIO $Q_O$ | ; | 15 % |
| TIME DURATION T | ; | 500msec |

| | | |
|---|---|---|
| LASER OSCILLATOR | ; | C2000 |
| PEAK OUTPUT | ; | 2500W |
| WORKPIECE THICKNESS | ; | 9.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DURY RATIO $Q_O$ | ; | 23 % |
| TIME DURATION T | ; | 300msec |

| | | |
|---|---|---|
| LASER OSCILLATOR | ; | C2000 |
| PEAK OUTPUT | ; | 2500W |
| WORKPIECE THICKNESS | ; | 9.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DURY RATIO $Q_O$ | ; | 23 % |
| TIME DURATION T | ; | 500msec |

| | | |
|---|---|---|
| LASER OSCILLATOR | ; | C2000 |
| PEAK OUTPUT | ; | 2500W |
| WORKPIECE THICKNESS | ; | 12.0mm |
| PULSE FREQUENCY INCREMENT | ; | 5 hz |
| PULSE DUTY RATIO INCREMENT P | ; | 1 % |
| INITIAL PULSE FREQUENCY $P_O$ | ; | 10 hz |
| INITIAL PULSE DURY RATIO $Q_O$ | ; | 23 % |
| TIME DURATION T | ; | 300msec |

| | | |
|---|---|---|
| LASER OSCILLATOR | ; | C2000 |
| PEAK OUTPUT | ; | 2500W |
| WORKPIECE OUTPUT | ; | 12.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DURY RATIO $Q_O$ | ; | 23 % |
| TIME DURATION T | ; | 500msec |

| | | |
|---|---|---|
| LASER OSCILLATOR | ; | C2000 |
| PEAK OUTPUT | ; | 2500W |
| WORKPIECE THICKNESS | ; | 16.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DUTY RATIO $Q_O$ | ; | 23 % |
| TIME DURATION T | ; | 300msec |

| | | |
|---|---|---|
| LASER OSCILLATOR | ; | C2000 |
| PEAK OUTPUT | ; | 2500W |
| WORKPIECE THICKNESS | ; | 16.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DUTY RATIO $Q_O$ | ; | 23 % |
| TIME DURATION T | ; | 500msec |

| | | |
|---|---|---|
| LASER OSCILLATOR | ; | C3000 |
| PEAK OUTPUT | ; | 3500W |
| WORKPIECE THICKNESS | ; | 16.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DUTY RATIO $Q_O$ | ; | 15 % |
| TIME DURATION T | ; | 300msec |

| LASER OSCILLATOR | ; | C3000 |
| PEAK OUTPUT | ; | 3500W |
| WORKPIECE THICKNESS | ; | 16.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DUTY RATIO $Q_O$ | ; | 15 % |
| TIME DURATION T | ; | 500msec |

| | | |
|---|---|---|
| LASER OSCILLATOR | : | C2000 |
| PEAK OUTPUT | : | 2500W |
| WORKPIECE THICKNESS | : | 19.0mm |
| PULSE FREQUENCY INCREMENT P | : | 5 hz |
| PULSE DUTY RATIO INCREMENT | : | 1 % |
| INITIAL PULSE FREQUENCY $P_0$ | : | 10 hz |
| INITIAL PULSE DUTY RATIO $Q_0$ | : | 23 % |
| TIME DURATION T | : | 300msec |

| | | |
|---|---|---|
| LASER OSCILLATOR | ; | C2000 |
| PEAK OUTPUT | ; | 2500W |
| WORKPIECE THICKNESS | ; | 19.0mm |
| PULSE FREQUENCY INCREMENT P | ; | 5 hZ |
| PULSE DUTY RATIO INCREMENT | ; | 1 % |
| INITIAL PULSE FREQUENCY $P_O$ | ; | 10 hz |
| INITIAL PULSE DUTY RATIO $Q_O$ | ; | 23 % |
| TIME DURATION T | ; | 500msec |

| | | |
|---|---|---|
| LASER OSCILLATOR | ; | C3000 |
| PEAK OUTPUT | ; | 3500W |
| WORKPIECE THICKNESS | ; | 19.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DUTY RATIO $Q_O$ | ; | 15 % |
| TIME DURATION T | ; | 500msec |

| | | |
|---|---|---|
| LASER OSCILLATOR | ; | C3000 |
| PEAK OUTPUT | ; | 3500W |
| WORKPIECE THICKNESS | ; | 22.0mm |
| PULSE FREQUENCY INCREMENT P | ; | 5 hz |
| PULSE DUTY RATIO INCREMENT | ; | 1 % |
| INITIAL PULSE FREQUENCY $P_O$ | ; | 10 hz |
| INITIAL PULSE DUTY RATIO $Q_O$ | ; | 15 % |
| TIME DURATION T | ; | 500msec |

| | |
|---|---|
| LASER OSCILLATOR | ; C3000 |
| PEAK OUTPUT | ; 3500W |
| WORKPIECE THICKNESS | ; 25.0mm |
| PULSE FREQUENCY INCREMENT P | ; 5 hz |
| PULSE DUTY RATIO INCREMENT | ; 1 % |
| INITIAL PULSE FREQUENCY $P_O$ | ; 10 hz |
| INITIAL PULSE DUTY RATIO $Q_O$ | ; 15 % |
| TIME DURATION T | ; 500msec |

LASER OSCILLATOR          ;   C1500, C2000
PEAK OUTPUT               ;   1500W
WORKPIECE THICKNESS       ;   9.0mm

| | | |
|---|---|---|
| LASER OSCILLATOR | : | C2000 |
| PEAK OUTPUT | : | 2500W |
| WORKPIECE THICKNESS | : | 9.0mm |

LASER OSCILLATOR : C1500, C2000
PEAK OUTPUT : 1500W
WORKPIECE THICKNESS : 12.0mm

PIERCING METHOD FOR LASER PROCESSING

BACKGROUND OF THE INVENTION

1. Field of the Invention

The present invention relates to a piercing method to be carried out at the start of processing in cutting a workpiece by means of a laser processing machine.

2. Description of the Related Art

In laser processing in which a laser beam is applied to a workpiece for cutting, a piercing operation must be performed at the start of the cutting work. This piercing operation is extremely difficult if the workpiece is a mild steel plate having a thickness of 9 mm or more, in particular. This is because the mild steel plate, which constitutes the workpiece, is susceptible to oxidation by oxygen to be used as an assistant gas, and the oxidation is liable to be excessively promoted by the laser beam, thereby causing an increase of scattered molten metal (sputters) and a thermal runaway. Thus, the piercing operation is carried out while repeating ON and OFF for the supply of the laser beam so that heating by the laser beam and cooling by a jet of the assistant gas alone can be repeated alternately.

According to a conventional piercing method, the piercing operation is performed with the output of the laser beam maintained constant, that is, with the peak value, frequency, and pulse duty ratio of laser pulses maintained constant, from the start to end of the processing. As a method for shortening the piercing time, there is a known method in which the processing time is shortened by increasing the peak value of the laser pulses so that the piercing depth for each cycle of operation can be increased. In order to increase the peak value, the power supply capacity must be increased, which entails higher equipment costs. Moreover, in practical use of such method, the high peak value makes the processing unstable, which ends up with a higher degree of fluctuation of the processing time. Further, the high peak value results in increased sputters, which may adhere to the inside of a processing nozzle, thereby clogging the nozzle, or damaging a focussing lens. Furthermore, it is hard to maintain stable processing over a prolonged period of time, and the peak output, in general, can be maintained only for a very short period of time, so that a resulting hole is too small for the normal cutting work to be started on completion of the piercing operation.

As an alternative method for shortening the piercing time, a method is described in Published Unexamined Japanese Patent Application No. 3-118989, in which the laser output value is lessened at the start of the piercing operation, and is continuously increased with time until an optimum laser output value is reached, and then the piercing operation is continued to the end with this output value. This method, however, is described as requiring 20 to 30 seconds from start to end in piercing a steel plate of 12-mm thickness. Also described in the aforesaid patent application is a method in which both the assistant gas pressure and the laser output value are increased concurrently and continuously, and a method in which the gap between the nozzle tip and the workpiece is narrowed while increasing the laser output value. Even when these methods are used, however, it is believed that the operation for piercing a steel plate of 12-mm thickness requires 15 to 20 seconds.

According to the methods described in Published Unexamined Japanese Patent Application No. 3-118989, control of the operation is very difficult, since the continuous increase of the assistant gas and continuous narrowing the aforesaid gap must be performed simultaneously with control of the continuous increase of the laser output. According to these methods, moreover, the piercing time cannot be shortened to desired extent. For instance, even with the conventional piercing method in which the piercing operation is performed with the laser output maintained constant, a steel plate of 12-mm thickness can be processed in about 20 seconds, proving no special advantage for time saving.

Thus far, there has not been provided any piercing method with which stable processing can be effected without causing any thermal runaway, the processing time for workpieces of the same material and thickness is subject to only minor dispersion, the processing time is shorter, and continuous processing can be enjoyed for a long period of time. This means that the aforementioned conventional methods are not good enough for meeting such requirements from a practical point of view.

SUMMARY OF THE INVENTION

The object of the present invention is to provide a piercing method in which stable processing can be accomplished in a short time, control is easy, and dispersion of the processing time is minor.

According to the present invention, processing is started with an initial pulse frequency and an initial pulse duty ratio, and the pulse frequency and the pulse duty ratio are increased by predetermined increments with every passage of a first predetermined time. Thereafter, the pulse frequency and the pulse duty ratio are successively increased by stages. After this increase is repeated a predetermined number of times, or after the passage of a predetermined time from the start of processing, piercing operation is continued to the end with the last set pulse frequency and the pulse duty ratio maintained.

The initial pulse frequency, the initial pulse duty ratio, the predetermined time for each step of phased increase, the predetermined increments of the pulse frequency and the pulse duty ratio, and the frequency of increase or the time elapsed after the start of processing, whereafter the increase of the pulse frequency and the pulse duty ratio is to be terminated, are changed depending on the thickness of a workpiece to be processed and the peak output of a laser.

DETAILED DESCRIPTION OF THE PREFERRED EMBODIMENTS

Figure 2:
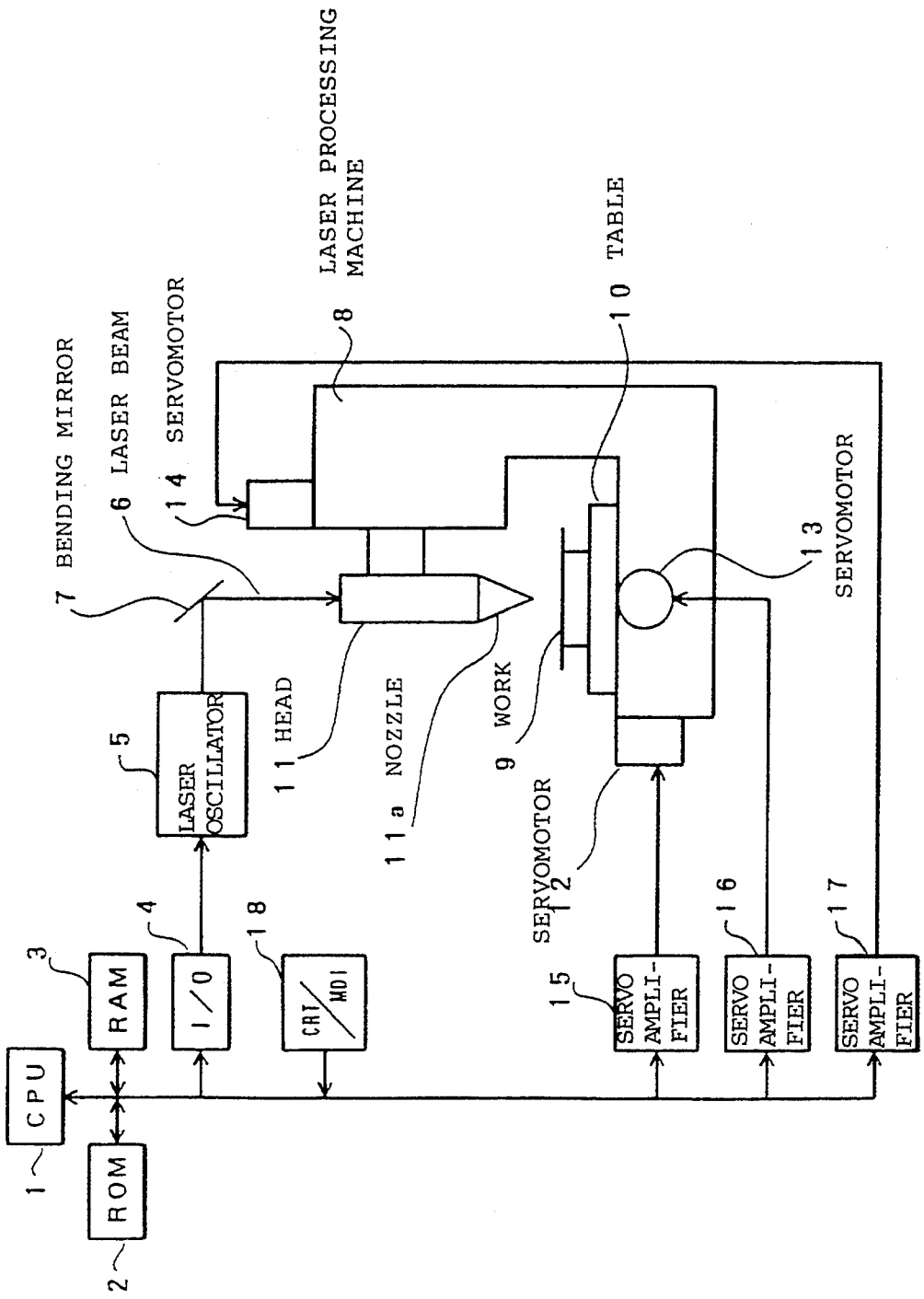
FIG. 2 is a block diagram showing the principal part of an NC laser apparatus for carrying out the method of the present invention.

FIG. 2 is a block diagram of an NC laser processing apparatus for carrying out a piercing control method according to the present invention. Based on a control program stored in a ROM 2, a processor 1 reads out a processing program stored in a memory 3, and controls the operation of the whole NC laser processing apparatus. An I/O unit 4 emits a pulsating laser beam 6 in accordance with a control signal from the processor 1. This laser beam is delivered to a laser processing machine 8 after being reflected by a bending mirror 7.

The laser processing machine 8 is provided with a table 10, on which a workpiece 9 is fixed, and a head 11 for applying the laser beam 6 to the workpiece 9. The laser beam 6 guided into the head 11 is focussed by a lens (not shown) in a nozzle 11a, and is applied to the workpiece 9. The laser processing machine 8 is provided with servomotors 12 and 13 for moving the table 10 in two directions perpendicular to each other or along X- and Y-axes respectively and a servomotor 14 for vertically moving the head 11. These servomotors 12, 13 and 14 are connected to servo amplifiers 15, 16 and 17, respectively, and are controllably rotated in response to axis control signals from the processor 1. Instructions are given to the laser processing machine 8 through a CRT/MDI 18.

The NC laser apparatus is constructed in the same manner as a conventional NC laser apparatus, and a detailed description thereof is omitted.

Figure 1:
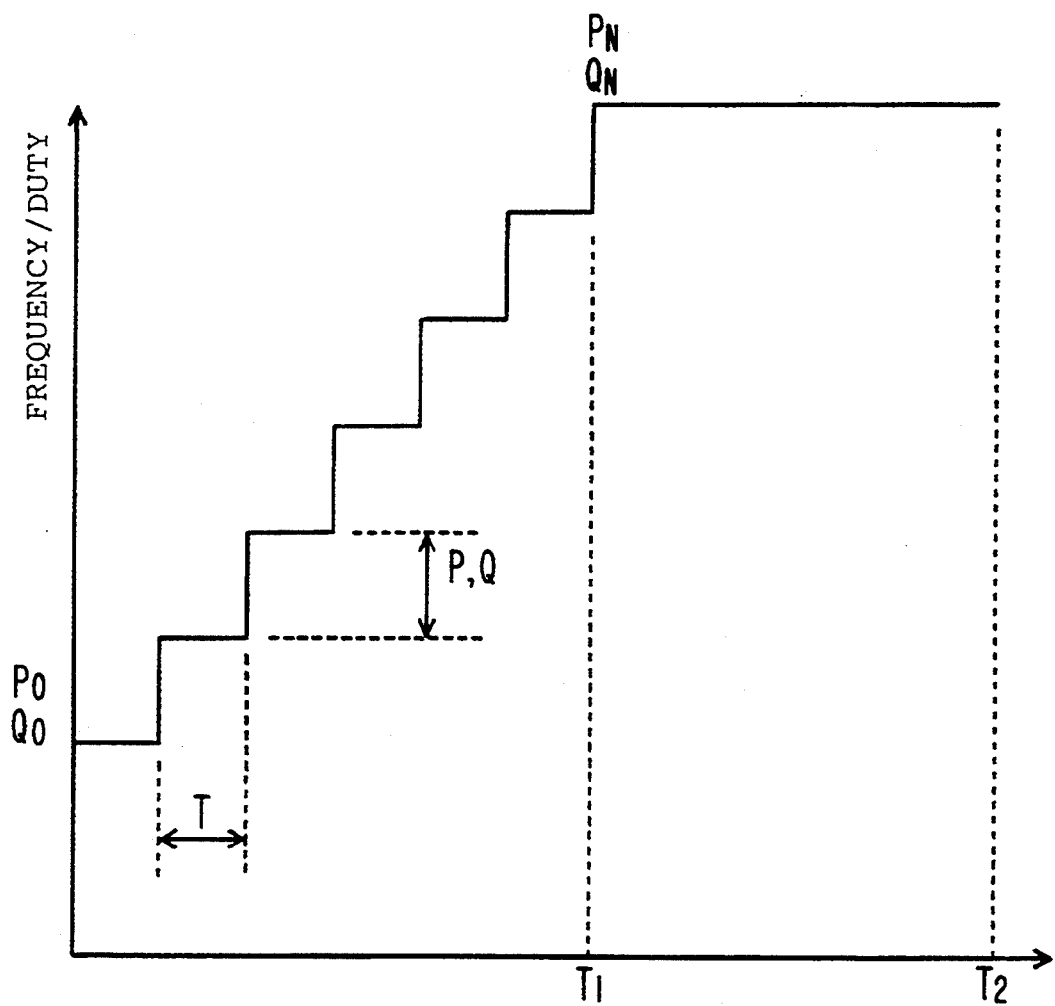
FIG. 1 is a diagram for illustrating the principle of operation of a piercing method according to the present invention.

Referring now to FIG. 1, the piercing method of the present invention using the NC laser apparatus will be described.

As shown in FIG. 1, a piercing operation is started with use of laser pulses with a predetermined initial pulse frequency $P_0$ and pulse duty ratio $Q_0$, and the pulse frequency and the pulse duty ratio are increased by stages, that is, by increments P and Q, respectively, with every passage of a predetermined time T. After the pulse frequency and the pulse duty ratio are increased a predetermined number N of times, or after the passage of a predetermined period of time $T_1$ from the start of the processing, the piercing operation is continued without changing an increased pulse frequency $P_N$ and pulse duty ratio $Q_N$ till a piercing completion time $T_2$ is reached. Thus, by increasing the pulse frequency and the pulse duty ratio, which have initially been set to small values, by stages, the piercing operation can be accomplished in a short period of time without causing a thermal runaway, and dispersion of the processing time can be reduced.

FIGS. 3 to 25 show the results of experiments made in order to obtain optimum values for the above parameters $P_0$, $Q_0$, P, Q, T and N.

Laser oscillators C2000 and C3000 from Fanuc Ltd. were used in the individual experiments the results of which are shown in FIGS. 3 to 25. When the laser oscillator C2000 was used, experiments were conducted under basic conditions (A). When the laser oscillator C3000 was used, experiments were conducted under basic conditions (B).

Figure 3:
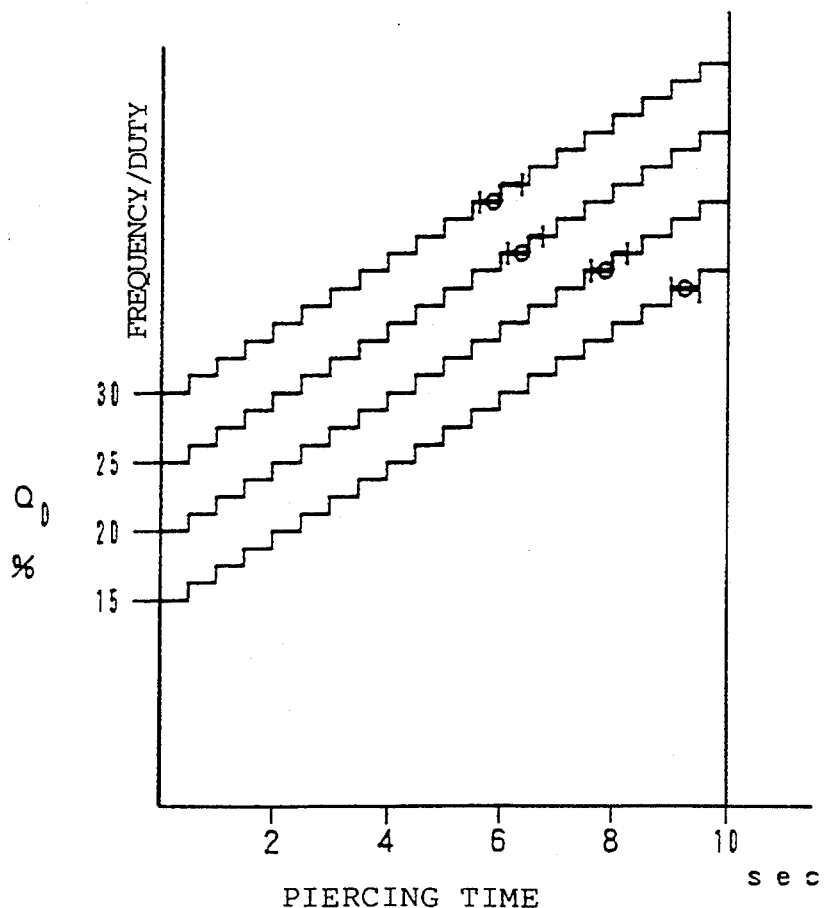
FIGS. 3 to 8 are graphs showing the results of experiments for obtaining optimum values of an initial pulse frequency and an initial pulse duty ratio according to the present invention.

Basic conditions (A)
 Optical path length: about 5.0 m
 Focal distance of lens: 7.50 inches
 Nozzle stand-off: 2.0 mm
 Nozzle hole diameter: 2.0 mm
 Assistant gas (oxygen) pressure: 0.25 kg/cm$^2$
 Focal position: cutting position
 Workpiece: mild steel
Basic conditions (B)
 Optical path length: about 6.0 m
 Focal distance of lens: 7.50 inches
 Nozzle stand-off: 2.0 mm
 Nozzle hole diameter: 3.0 mm
 Assistant gas (oxygen) pressure: 0.10 kg/cm$^2$
 Focal position: cutting position
 Workpiece: mild steel FIG. 3 shows the results of an experiment conducted with the initial pulse duty ratio $Q_0$ varied under the following conditions.
 Laser oscillator: C2000
 Workpiece thickness: 12 mm
 Peak output: 2,500 W
 Initial pulse frequency $P_0$: 10 Hz
 Initial pulse duty ratio $Q_0$: 15%, 20%, 25%, 30%
 Pulse frequency increment P: 5 Hz
 Pulse duty ratio increment Q: 1%
 Time interval T: 500 msec In FIG. 3, the ranges defined by solid lines are piercing completion sections, and circles in these sections represent the average times required for the completion of processing. For example, in the case where the pulse duty ratio $Q_0$ at the start is $Q_0=30\%$, the circle indicates that the processing is finished in about 6 seconds. As seen from FIG. 3, the piercing time can be shortened by increasing the pulse duty ratio $Q_0$ at the start of processing.

Figure 4:
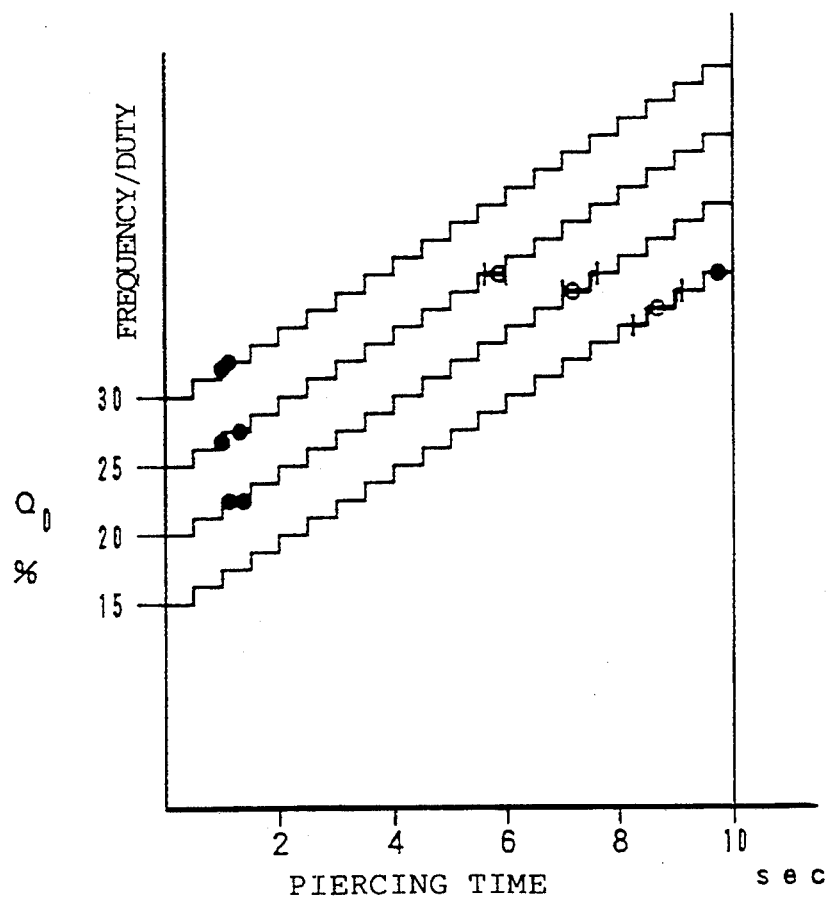

FIG. 4 shows the results of an experiment conducted with the pulse frequency $P_0$ at the start of processing, among the processing conditions shown in FIG. 3, changed to 50 Hz, and with other conditions unchanged. In FIG. 4, black spots represent locations where thermal runaways have occurred.

Comparison between FIGS. 3 and 4 indicates that a thermal runaway is more easily to occur when the initial pulse frequency $P_0$ at the start of processing is increased.

Figure 5:
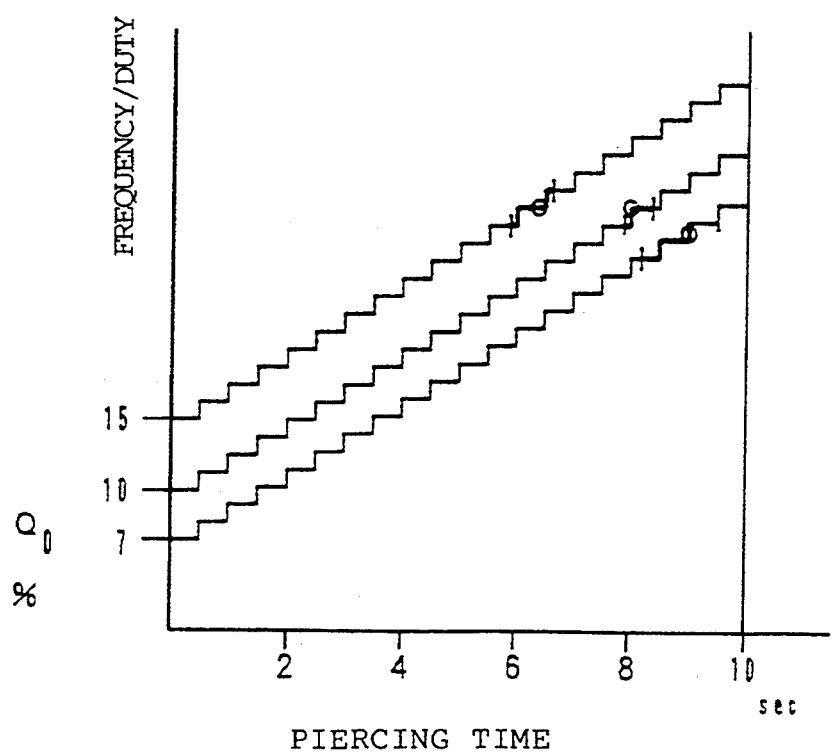

FIG. 5 shows the results of an experiment conducted with the initial pulse duty ratio $Q_0$ varied under the following conditions.
 Laser oscillator: C3000
 Workpiece thickness: 12 mm
 Peak output: 3,500 W
 Initial pulse frequency $P_0$: 5 Hz
 Initial pulse duty ratio $Q_0$: 7%, 10%, 15%
 Pulse frequency increment P: 5 Hz
 Pulse duty ratio increment Q: 1%
 Time interval T: 500 msec FIG. 6 shows the results of an experiment conducted with the initial pulse frequency $P_0$, among the processing conditions shown in FIG. 5, changed to 10 Hz.

Figure 6:
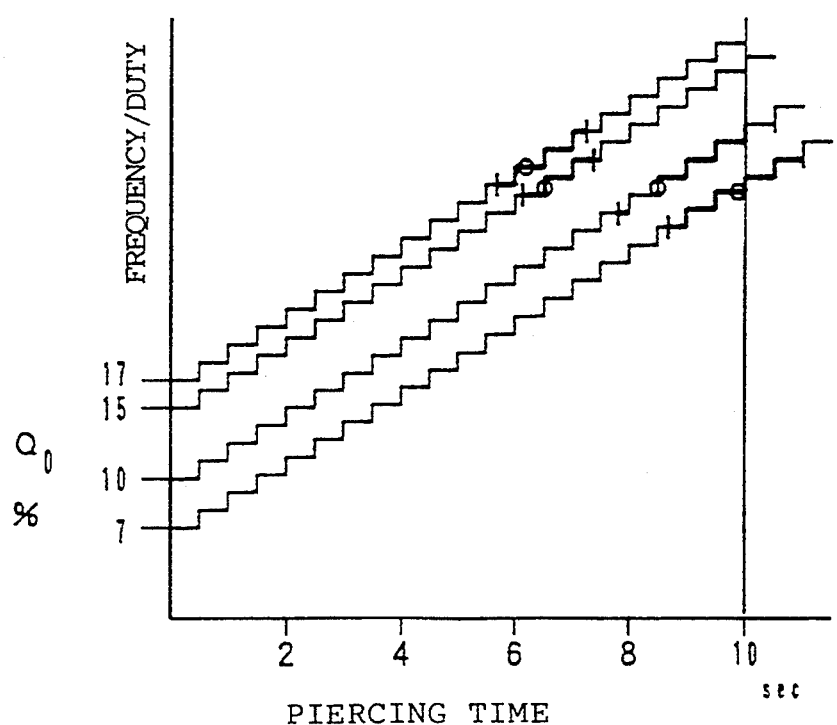

Comparison between FIGS. 5 and 6 indicates that the time required for completing processing makes no marked difference even though the pulse frequency $P_0$ at the start of processing is changed from 5 Hz to 10 Hz. Further, comparison between FIGS. 3 and 6 indicates that the processing time can be shortened by increasing the peak output. For example, in the case where the duty ratio $Q_0$ at the start of processing is $Q_0=15\%$, the necessary processing time ranges from 9 to 9.5 seconds in FIG. 3, while 6 to 7 seconds in the case shown in FIG. 6.

Figure 7:
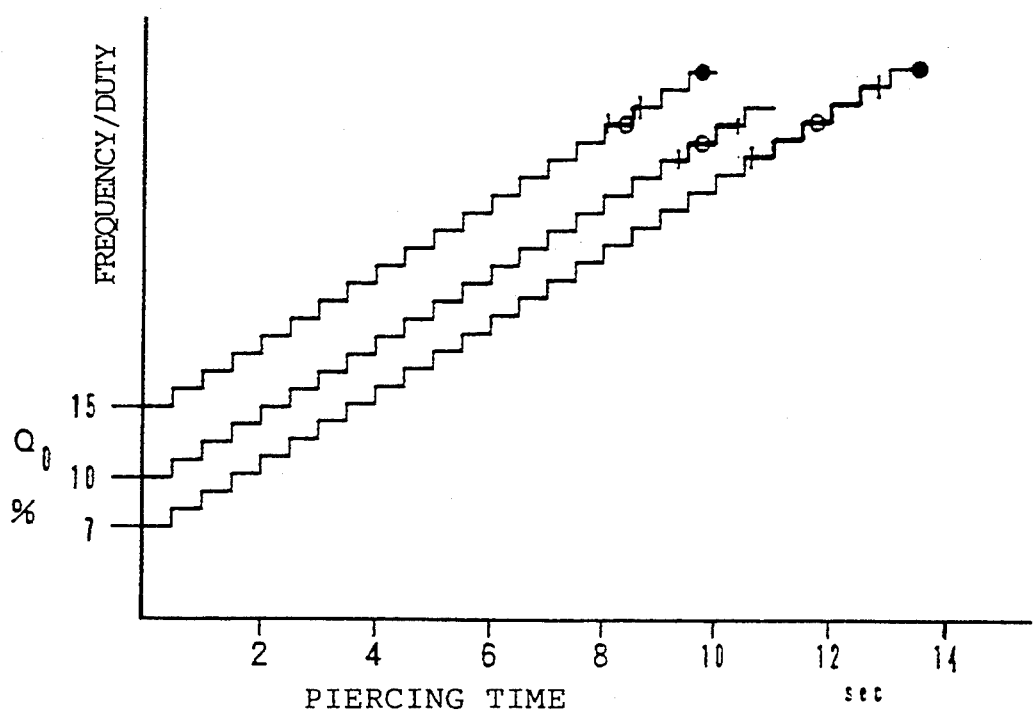
Figure 8:
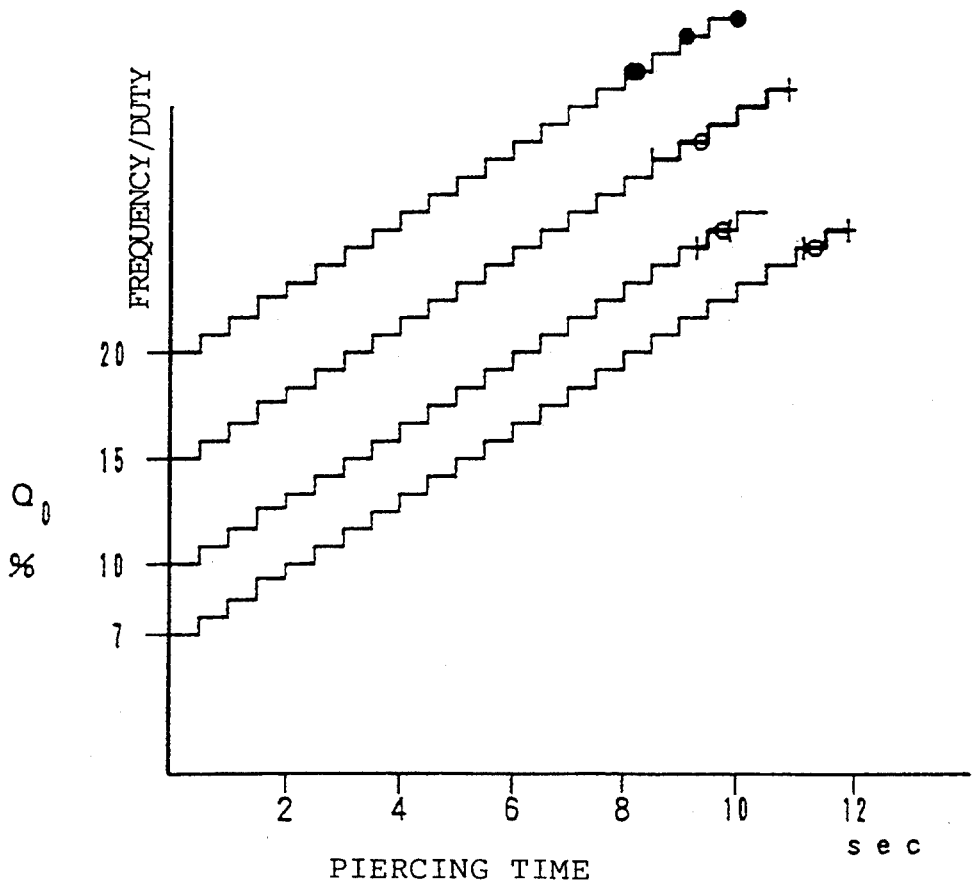

FIG. 7 shows the results of an experiment conducted with the workpiece thickness, among the processing conditions shown in FIG. 6, changed to 16 mm. Further, FIG. 8 shows the results of an experiment conducted with the initial pulse frequency $P_0$, among the processing conditions shown in FIG. 7, changed to 5 Hz.

Thus, the following is evident from the experimental results shown in FIGS. 3 to 8. First, if the pulse duty ratio $Q_0$ at the start of processing is increased, processing time can be shortened, although thermal runaway is more likely to occur. Secondly, the higher the pulse frequency $P_0$ at the start of processing, the more thermal runaway is likely to occur. Thirdly, the higher the peak output, the shorter the processing time is.

FIGS. 9 to 12 are graphs showing the results of experiments conducted with the time interval for phased increase of the pulse frequency and the pulse duty ratio, that is, time duration T for each step, varied under the following conditions, in order to obtain an optimum value for the time duration T.

Laser oscillator: C3000
Workpiece thickness: 12 mm
Peak output: 3,500 W
Initial pulse frequency $P_0$: 10Hz
Initial pulse duty ratio $Q_0$: 15%
Pulse frequency increment P: 5 Hz
Pulse duty ratio increment Q: 1%

Figure 9:
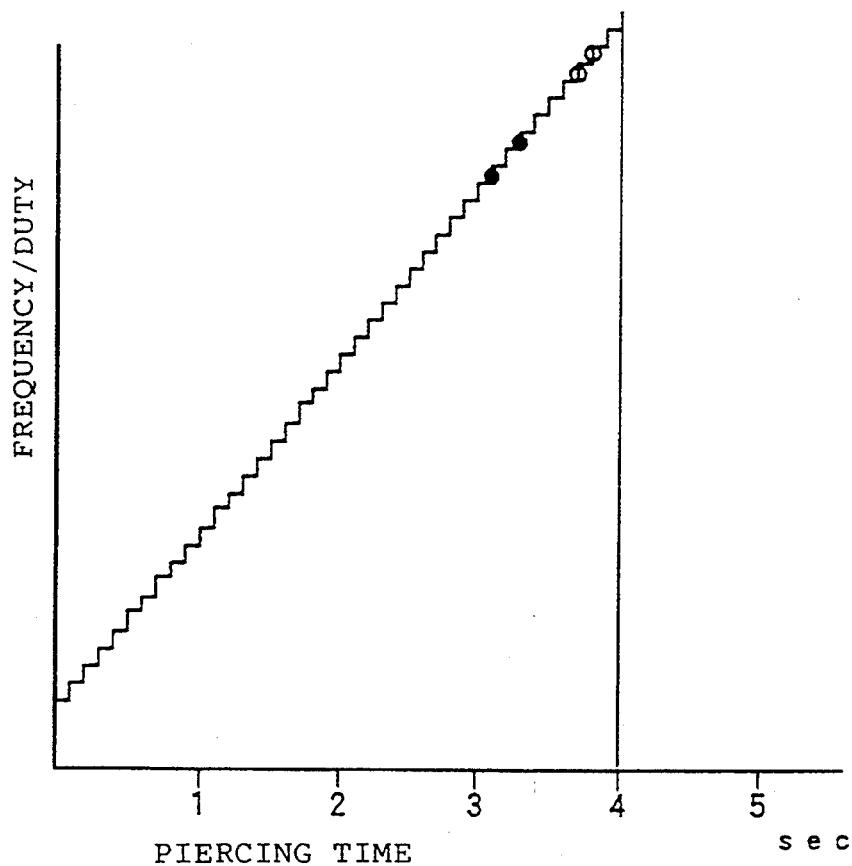
FIGS. 9 to 12 are graphs showing the results of experiments for obtaining an optimum value of a time interval for a step of increasing the pulse frequency and the pulse duty ratio by stages according to the present invention.
Figure 10:
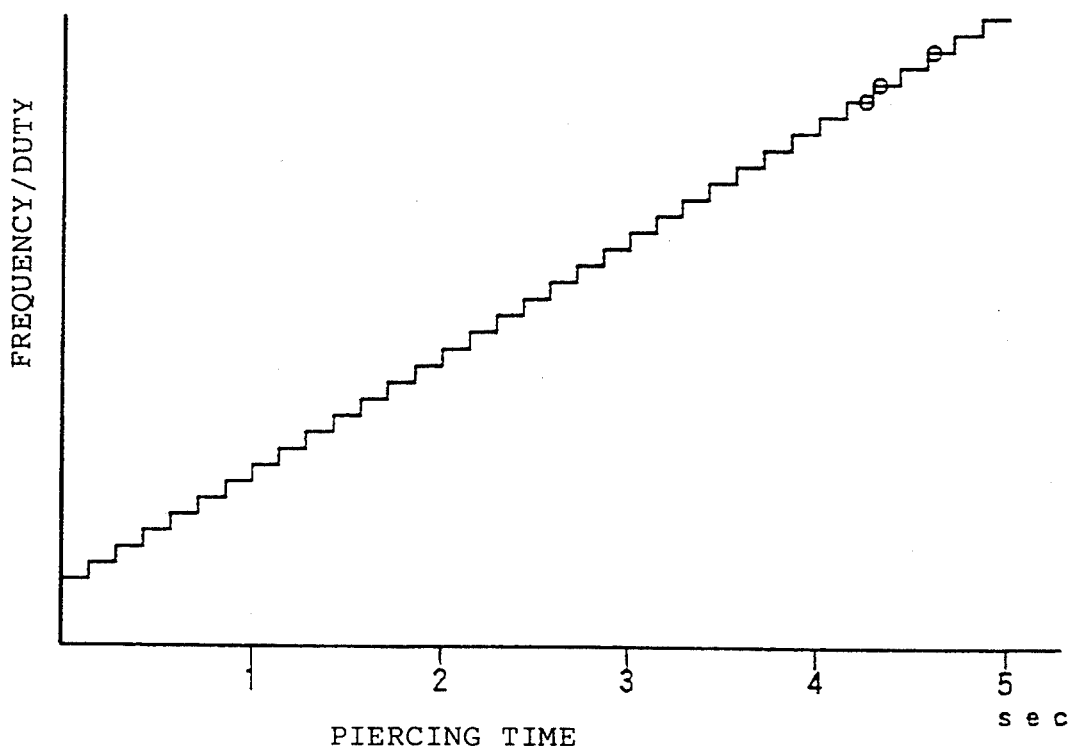
Figure 11:
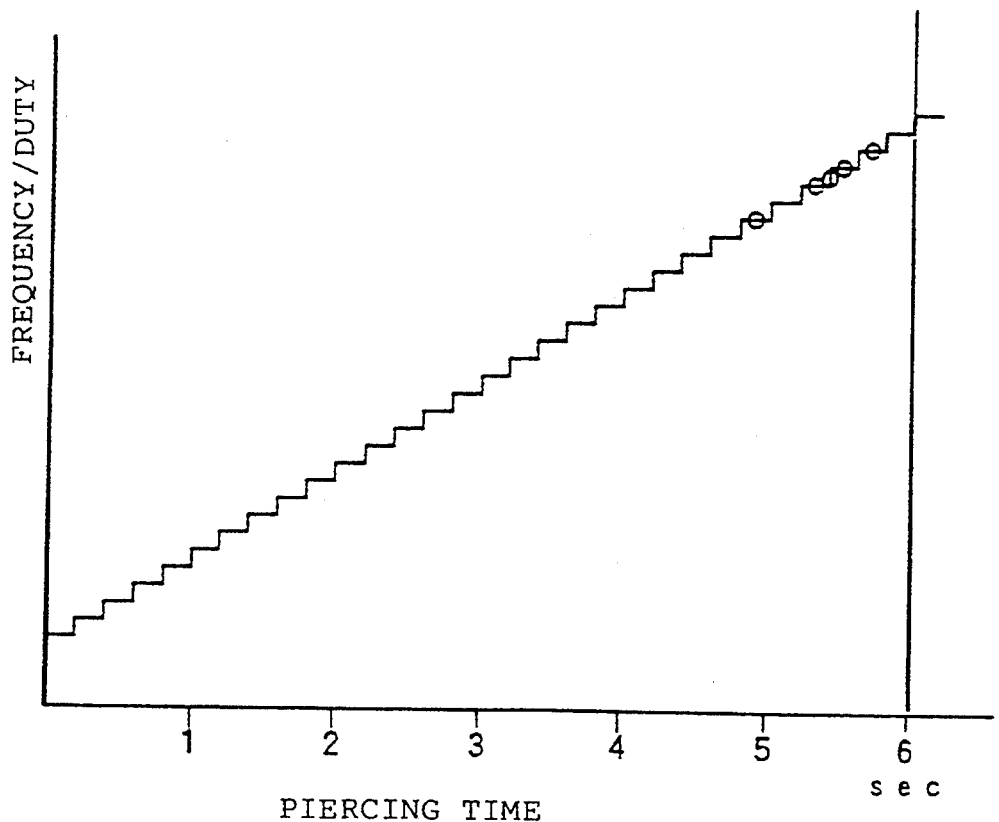
Figure 12:
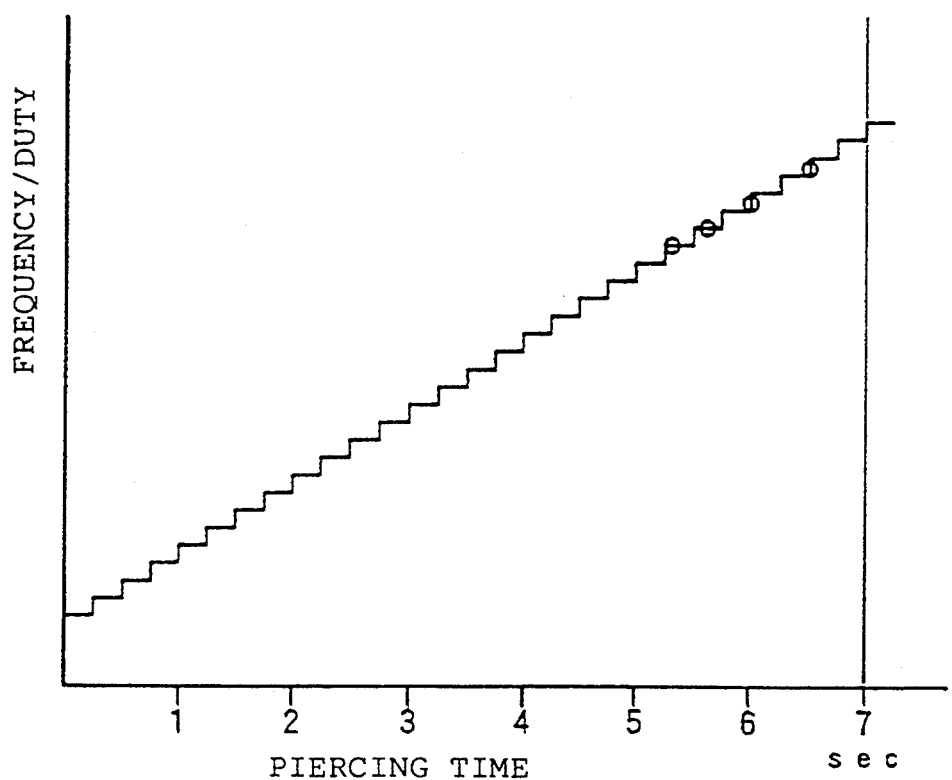

The time interval T is 200 msec in FIG. 9, 300 msec in FIG. 10, 400 msec in FIG. 11, and 500 msec in FIG. 12.

As seen from FIGS. 9 to 12, the shorter the time duration T, the shorter the processing time is. If time interval T=200 msec is given, however, a thermal runaway occurs, as shown in FIG. 9. As seen from FIGS. 10 to 12, moreover, the dispersion of the processing time increases if the time interval T is extended. It is evident, therefore, that there is an optimum time interval T during which the processing time is short, a thermal runaway will not occur, and the dispersion of the processing time is minor. In the cases of these experiments, the optimum time interval T proves to be about 300 msec.

FIGS. 13 to 28 are graphs showing the results of experiments in which the processing time was determined with the number of times N of the phased increase of the pulse frequency and the pulse duty ratio varied.

Figure 13:
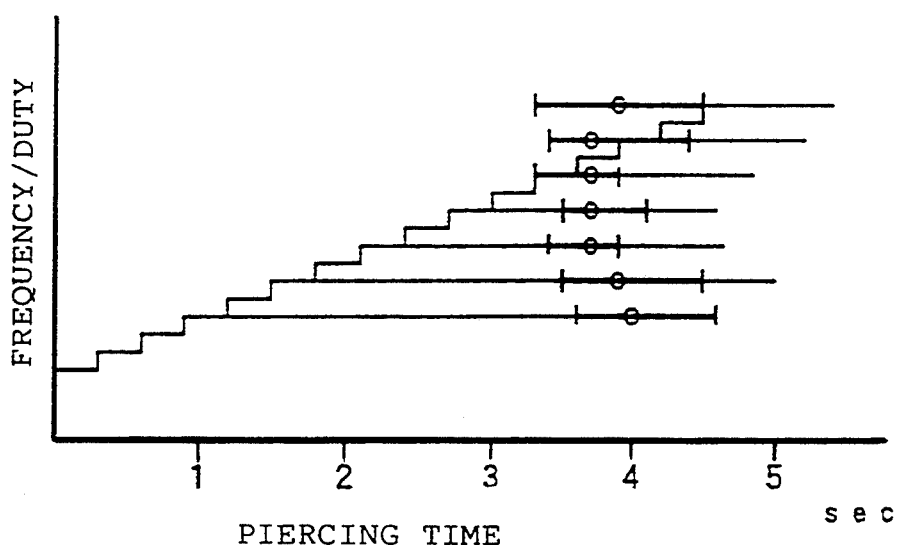
FIGS. 13 to 25 are graphs showing the results of experiments for obtaining an optimum value of the number of times for increasing of the pulse frequency and the pulse duty ratio or a time interval from the start of processing.

FIG. 13 shows the results of an experiment conducted with the number of times N for increase varied under the following conditions.

Figure 14:
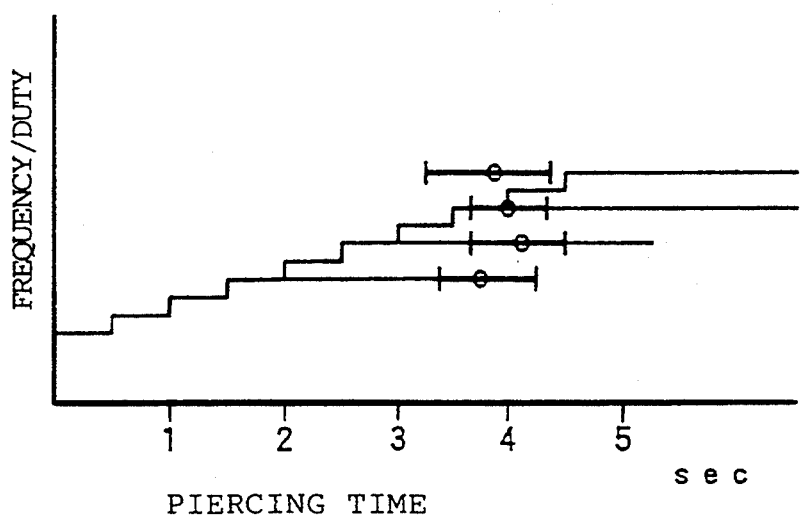

Laser oscillator: C2000
Workpiece thickness: 9 mm
Peak output: 2,500 W
Initial pulse frequency $P_0$: 10 Hz
Initial pulse duty ratio $Q_0$: 23%
Pulse frequency increment P: 5 Hz
Pulse duty ratio increment Q: 1%
Time interval T: 300 msec FIG. 14 shows the results of an experiment conducted with the time interval T changed to 500 msec, indicating that the processing time is shorter with the time interval T at 300 msec, and becomes longer and undergoes a higher degree of dispersion if the increase number of times N is too low or too high. According to this experiment, it can be comprehended that the processing time is short and its dispersion is minor with the time interval T at 300 msec and the number of times N for increase ranging from about 9 to 11.

Figure 15:
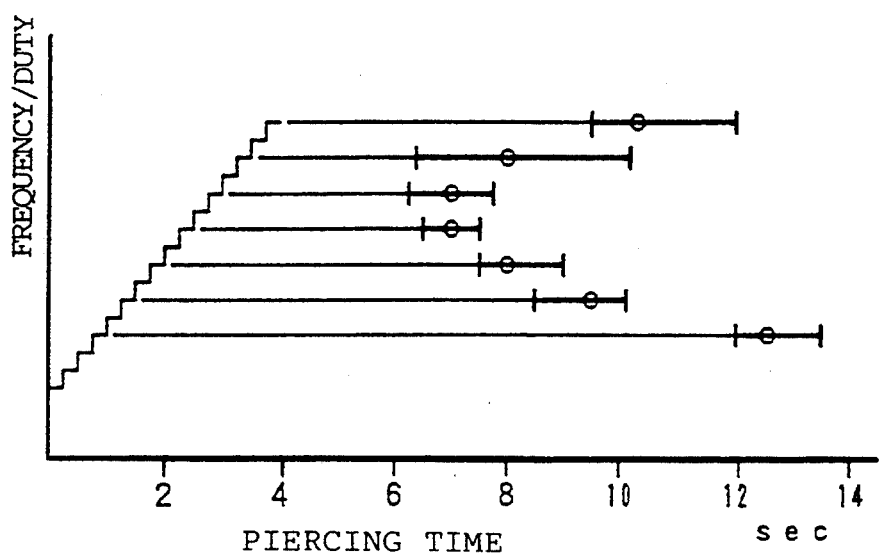

FIG. 15 shows the results of an experiment conducted with the workpiece thickness, among the processing conditions shown in FIG. 13, changed to 12 mm. In this case, it can be comprehended that the processing time becomes shorter, and its dispersion becomes smaller when the number of times N for increase ranges from about 9 to 11.

Figure 16:
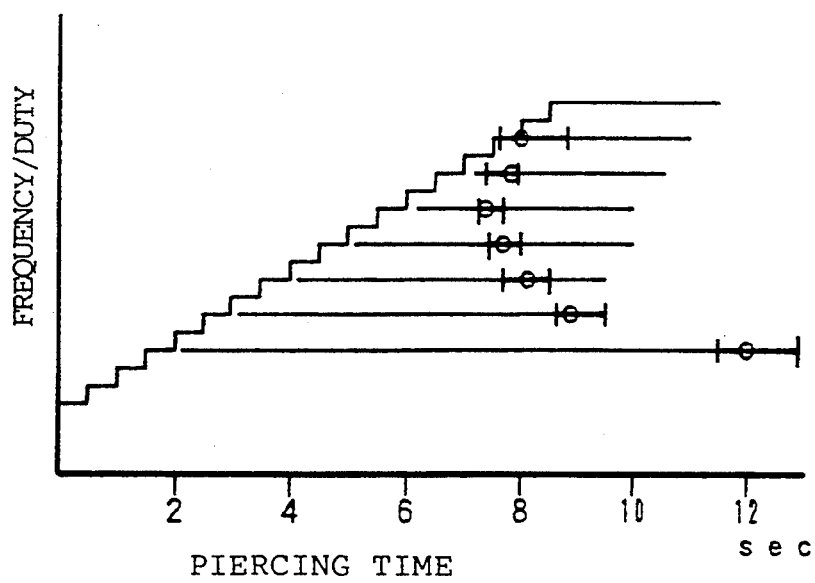

FIG. 16 shows the results of an experiment conducted with the workpiece thickness, among the processing conditions shown in FIG. 14, changed to 12 mm. In this case, it can be comprehended that the processing time becomes shorter and its dispersion becomes smaller when the number of times N for increase is 11.

Figure 17:
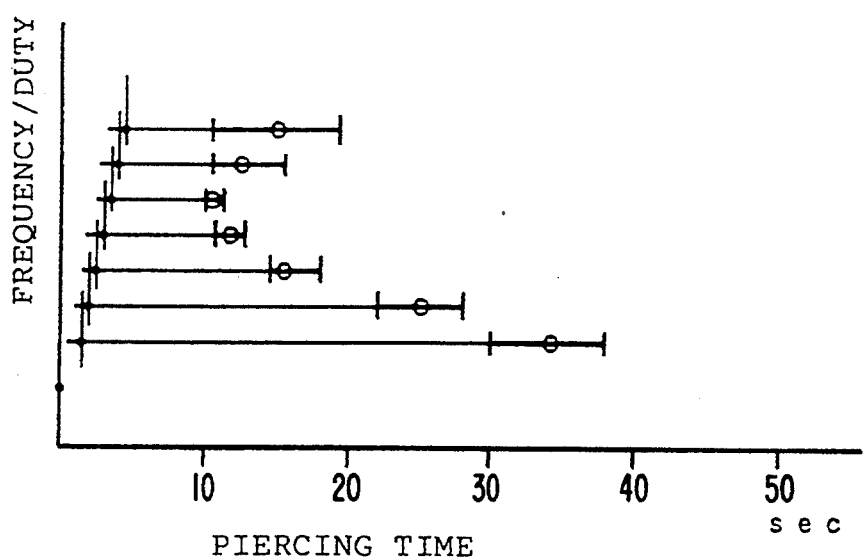
Figure 18:
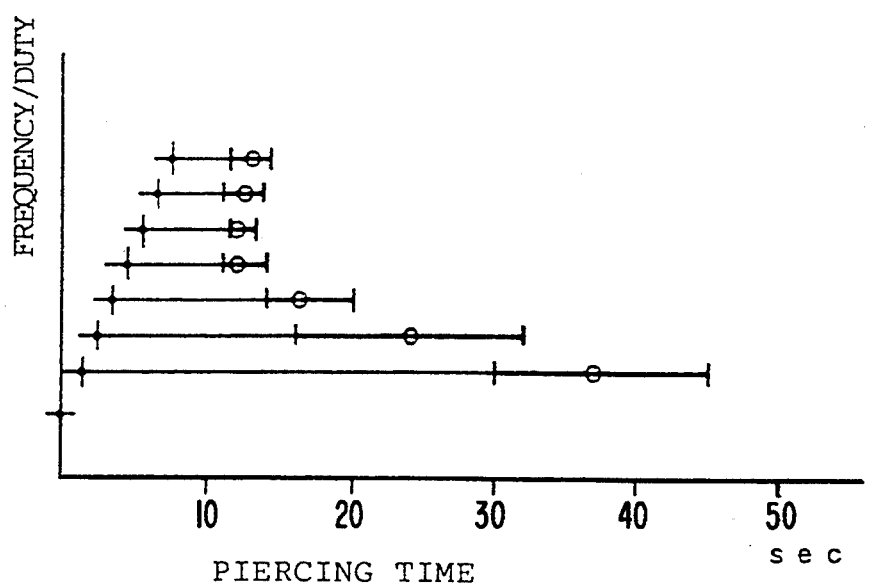

FIG. 17 shows the results of an experiment conducted with the workpiece thickness, among the processing conditions shown in FIG. 13, changed to 16 mm, and FIG. 18 shows the results of an experiment conducted with the workpiece thickness, among the processing conditions shown in FIG. 14, changed to 16 mm. The time interval T is 300 msec in the case shown in FIG. 17 and 500 msec in the case shown in FIG. 18.

As is also seen from FIGS. 17 and 18, there is a number of times N (optimum: 10 or 11) for the increase of the pulse frequency and the pulse duty ratio at which the processing time becomes shorter, and its dispersion becomes smaller.

Figure 19:
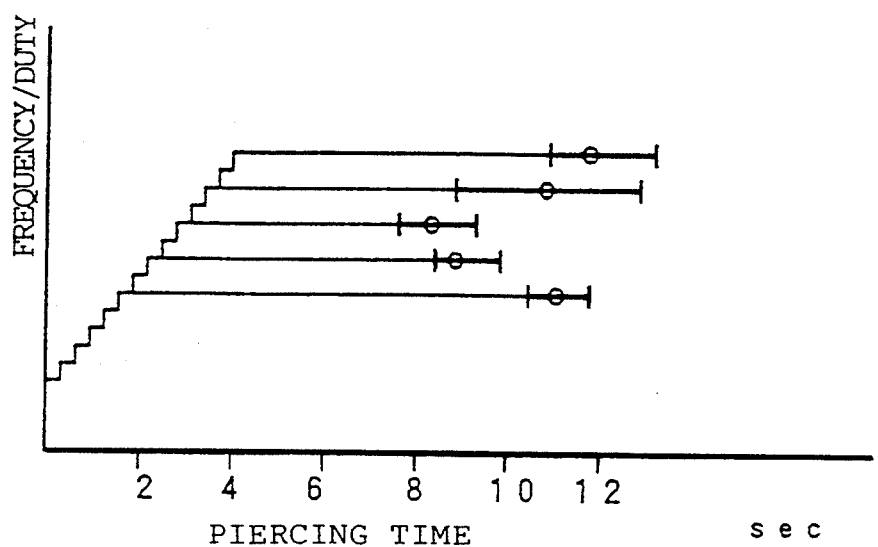
Figure 20:
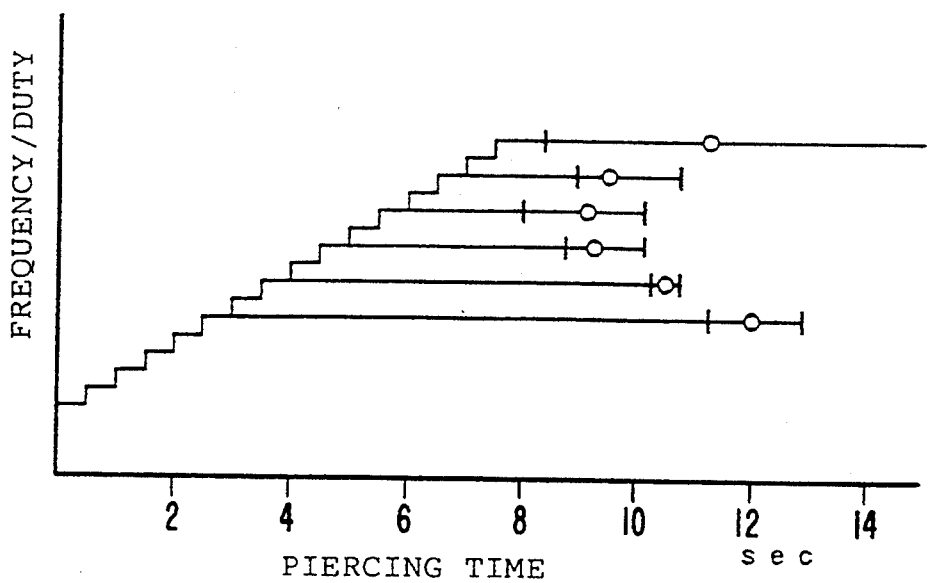

FIGS. 19 and 20 show the results of experiments conducted with the time interval T varied under the following conditions.

Laser oscillator: C3000
Workpiece thickness: 16 mm
Peak output: 3,500 W
Initial pulse frequency $P_0$: 10 Hz
Initial pulse duty ratio $Q_0$: 15%
Pulse frequency increment P: 5 Hz
Pulse duty ratio increment Q: 1%

The time interval T is 300 msec in FIG. 19 and 500 msec in FIG. 20.

In this case too, it is indicated that the processing time can be shortened and its dispersion can be made relatively small with the increase number of times N set to about 10.

Figure 21:
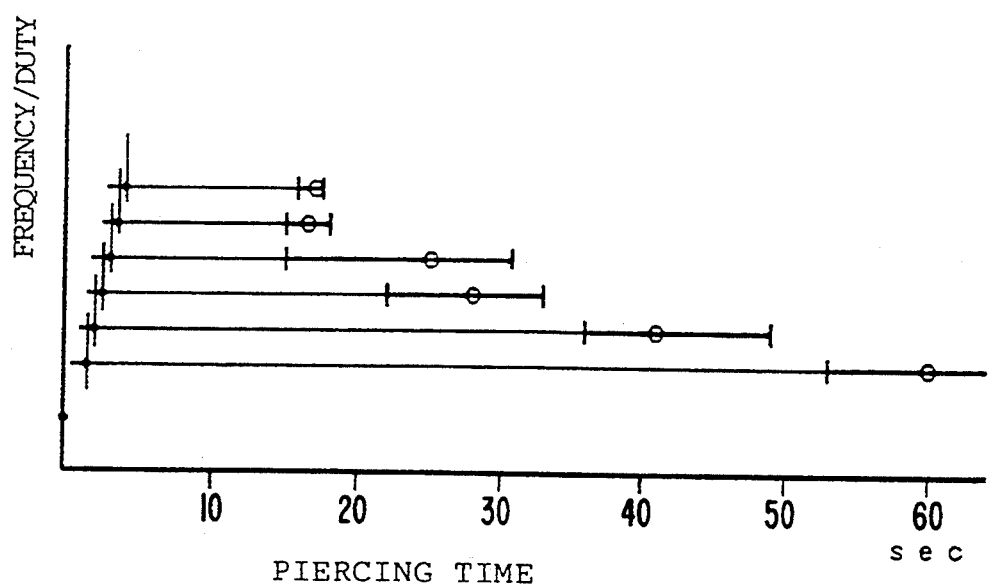
Figure 22:
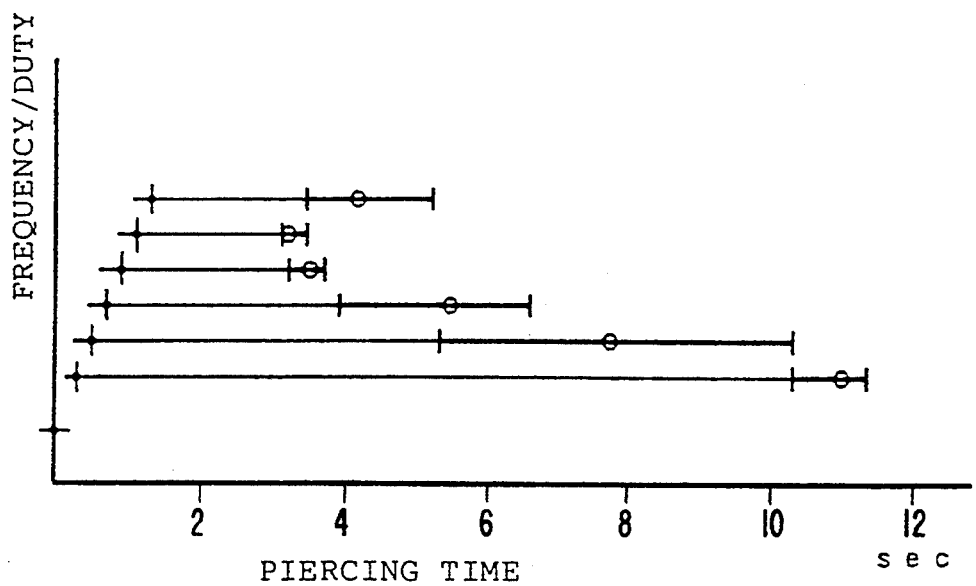

FIGS. 21 and 22 show the results of experiments conducted with the time interval T varied under the following conditions:

Laser oscillator: C2000
Workpiece thickness: 19 mm
Peak output: 2,500 W
Initial pulse frequency $P_0$: 10 Hz
Initial pulse duty ratio $Q_0$: 23%
Pulse frequency increment P: 5 Hz
Pulse duty ratio increment Q: 1%

The time interval T is 300 msec in FIG. 21 and 500 msec in FIG. 22.

These experimental results also indicate that there is an optimum value for the increase number of times N, and that the processing time becomes shorter, and its dispersion becomes smaller when the increase number of times N is at about 12 or 13.

Figure 23:
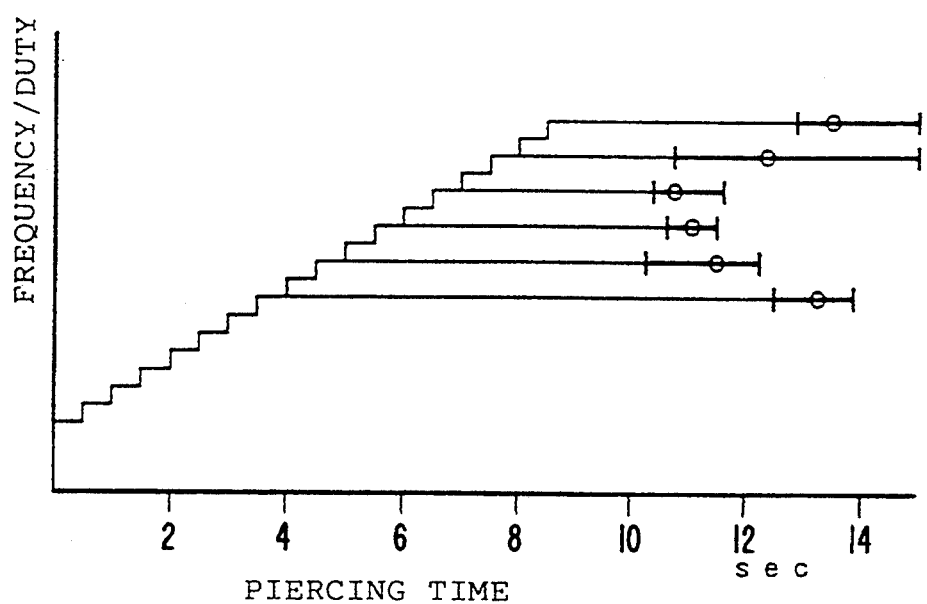
Figure 24:
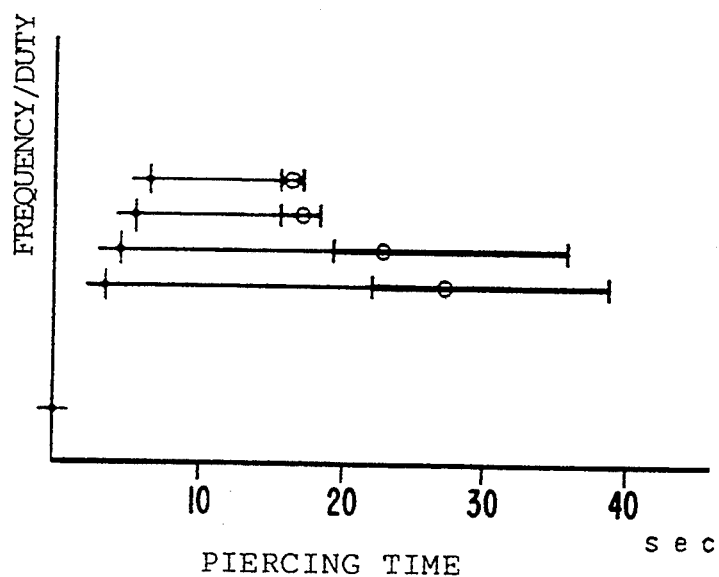
Figure 25:
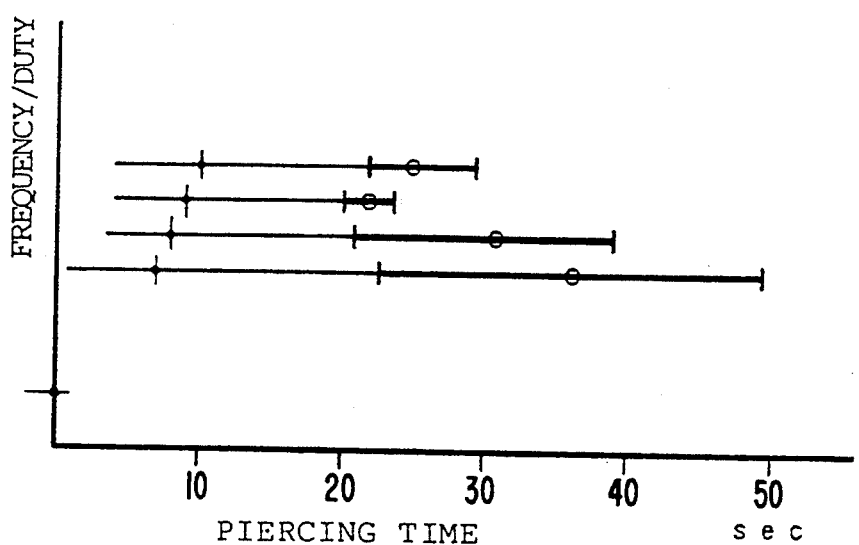

FIGS. 23 to 25 show the results of experiments in which workpieces of different thicknesses were processed under the following conditions:

Laser oscillator: C3000
Peak output: 3,500 W

Initial pulse frequency $P_0$: 10 Hz
Initial pulse duty ratio $Q_0$: 15%
Pulse frequency increment P: 5 Hz
Pulse duty ratio increment Q: 1%

If priority is to be given to the speed of processing, the values shown in Table 2 are optimum, and the processing time can be further shortened by using these values.

TABLE 1

| WORKPIECE THICKNESS (mm) | PEAK OUTPUT (W) | INITIALIZATION CONDITIONS | | INCREMENT/STEP | | TIME DURATION (msec) | INCREASE FREQUENCY | PIERCING TIME (sec) |
|---|---|---|---|---|---|---|---|---|
| | | FREQUENCY (Hz) | DUTY (%) | FREQUENCY (Hz) | DUTY (%) | | | |
| 9 | 1500 | 10 | 30 | 5 | 1 | 500 | 12 | 6.0 ± 1.0 |
| | 2500 | 10 | 23 | 5 | 1 | 300 | 9 | 3.5 ± 0.5 |
| | 2500 | 10 | 23 | 5 | 1 | 500 | 9 | 3.9 ± 0.5 |
| 12 | 1500 | 10 | 30 | 5 | 1 | 500 | 19 | 10.0 ± 1.0 |
| | 2500 | 10 | 23 | 5 | 1 | 300 | 10 | 5.8 ± 0.5 |
| | 2500 | 10 | 23 | 5 | 1 | 500 | 11 | 7.0 ± 0.5 |
| 16 | 2500 | 10 | 23 | 5 | 1 | 300 | 11 | 11.7 ± 1.0 |
| | 2500 | 10 | 23 | 5 | 1 | 500 | 11 | 12.6 ± 1.0 |
| | 3500 | 10 | 15 | 5 | 1 | 500 | 10 | 8.8 ± 1.0 |
| 19 | 2500 | 10 | 23 | 5 | 1 | 300 | 12 | 17.6 ± 3.0 |
| | 2500 | 10 | 23 | 5 | 1 | 500 | 13 | 16.4 ± 2.0 |
| | 3500 | 10 | 15 | 5 | 1 | 500 | 12 | 11.6 ± 1.0 |
| 22 | 2500 | 10 | 23 | 5 | 1 | 300 | 14 | 23.0 ± 3.0 |
| | 2500 | 10 | 23 | 5 | 1 | 500 | 14 | 26.0 ± 3.0 |
| | 3500 | 10 | 15 | 5 | 1 | 500 | 14 | 15.3 ± 3.0 |
| 25 | 3500 | 10 | 15 | 5 | 1 | 500 | 17 | 22.0 ± 3.0 |

TABLE 2

| WORKPIECE THICKNESS (mm) | PEAK OUTPUT (W) | INITIALIZATION CONDITIONS | | INCREMENT/STEP | | TIME DURATION (msec) | INCREASE FREQUENCY | PIERCING TIME (sec) |
|---|---|---|---|---|---|---|---|---|
| | | FREQUENCY (Hz) | DUTY (%) | FREQUENCY (Hz) | DUTY (%) | | | |
| 9 | 3500 | 10 | 15 | 14 | 1 | 300 | 5 | 2.5 ± 0.5 |
| 12 | 3500 | 10 | 15 | 13 | 1 | 300 | 6 | 4.0 ± 0.5 |
| 16 | 3500 | 10 | 15 | 8 | 1 | 300 | 7 | 7.8 ± 1.0 |
| 19 | 3500 | 10 | 15 | 6 | 1 | 300 | 10 | 10.9 ± 1.5 |

Time interval T: 500 msec
The workpiece thickness is 19.0 mm in FIG. 23 and 22.0 mm in FIG. 25.

As is also seen from these drawings, the processing time increase and undergoes a higher degree of dispersion if the number of times N for the increase of the pulse frequency and the pulse duty ratio is too low or too high, and there is an optimum increase number of times N, at which the processing time can be shortened and its dispersion can be reduced, that is, when the increase number of times N ranges from 14 to 17.

These individual experimental results indicate that the initial pulse frequency $P_0$ and the initial pulse duty ratio $Q_0$ have their respective optimum values, since the processing time becomes longer if they are too small, and a thermal runaway occurs if the values are too large. Further, the shorter the time interval T for each step of increasing the pulse frequency and the pulse duty ratio by stages, the shorter the processing time can be made, and the lower the degree of its dispersion can be made. If the time interval T is too short, however, a thermal runaway is liable to occur. Thus, it is evident that the time interval T also has its optimum value. Moreover, it can be comprehended that the number of times N for the increase of the pulse frequency and the pulse duty ratio also has a value at which the processing time is shortened and its dispersion is reduced.

Based on the experimental results thus obtained, it can be concluded that the values shown in Table 1 are substantially optimum values for the aforesaid parameters which shorten the processing time, prevent a thermal runaway, and reduce the dispersion of the processing time during standard use. Table 1 shows piercing times under the various conditions.

FIGS. 26 to 31 show the results of experimental determinations of the processing time for a conventional piercing method, in which piercing operation is performed with a fixed laser output by maintaining the peak value, frequency, and pulse duty ratio of laser pulses constant from the start to end of the processing.

Figure 26:
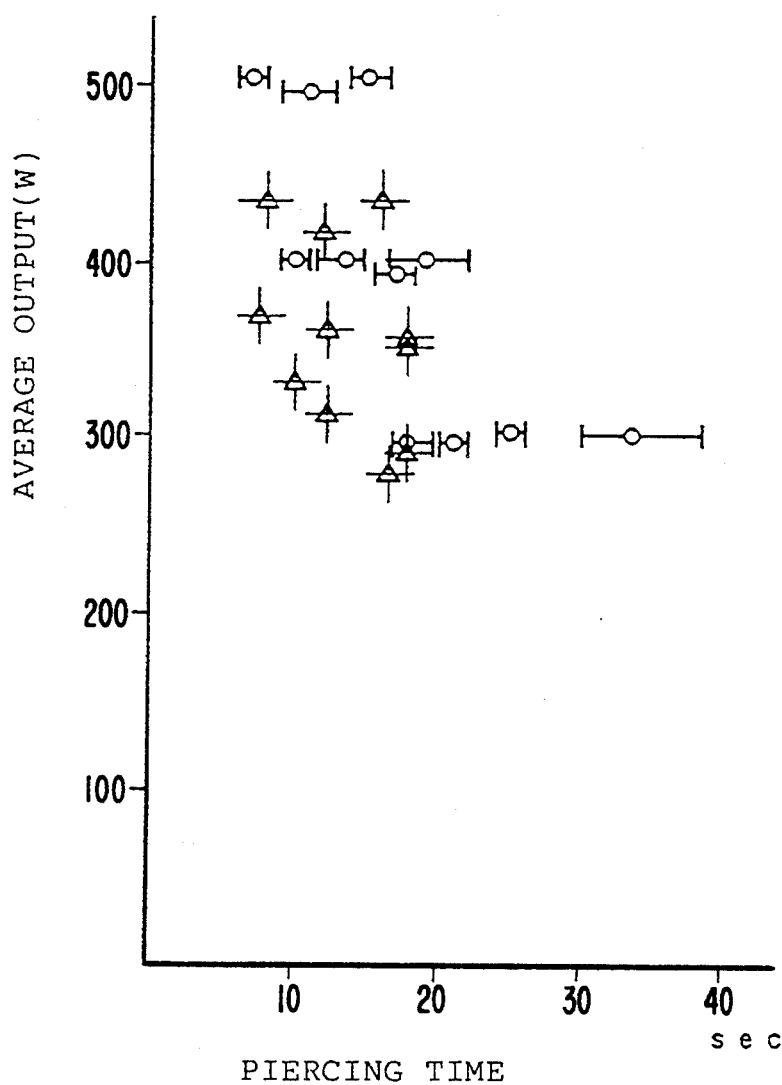
FIGS. 26 to 31 are graphs showing the results of experiments on processing according to a conventional piercing method.

FIG. 26 is a graph showing the piercing time determined when a mild steel plate of 9-mm thickness was processed with different constant average outputs (average output varies depending on the pulse frequency and pulse duty ratio) and with the peak output of 1,500 W by using laser oscillators C1500 and C2000 from Fanuc Ltd. under basic conditions (C) and (D), respectively.

Basic conditions (C)
  Optical path length: about 5.0 m
  Focal distance of lens: 5.00 inches
  Nozzle stand-off: 1.0 mm
  Nozzle hole diameter: 1.5 mm
  Assist gas (oxygen) pressure: 0.30 kg/cm$^2$
  Focal position: cutting position Basic conditions (D)
  Optical path length: about 5.0 m
  Focal distance of lens: 7.50 inches
  Nozzle stand-off: 1.0 mm
  Nozzle hole diameter: 2.0 mm
  Assist gas (oxygen) pressure: 0.30 kg/cm$^2$
  Focal position: cutting position In FIG. 26, triangles represent the result of one experiment of piercing operation; horizontal bars indicate ranges of the dispersion of the processing end time defined when a plurality of experiments were made under the same conditions, while circles represent average processing times.

As seen from FIG. 26, piercing a plate of 9-mm thickness requires at least about 9 seconds.

Figure 27:
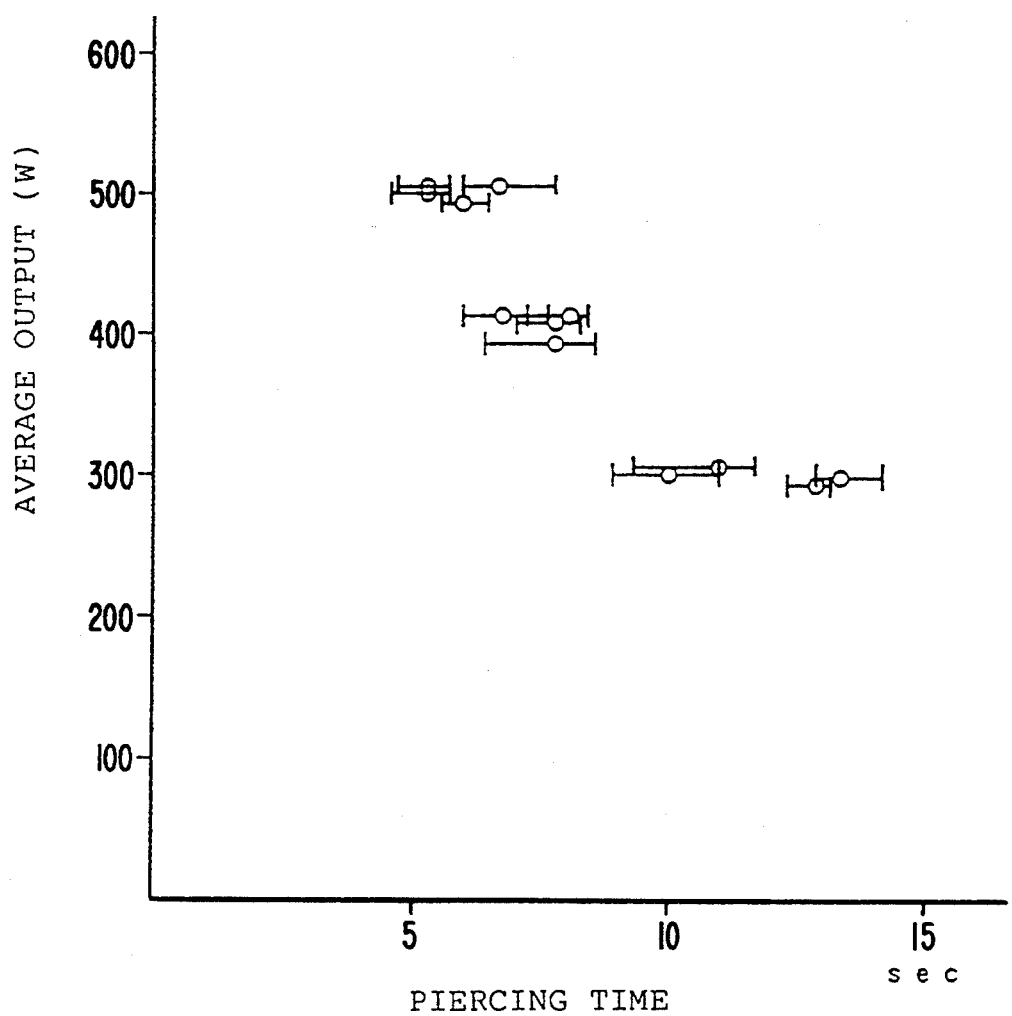

FIG. 27 is a graph showing the piercing time determined when a mild steel plate of 9-mm thickness was processed with various constant average outputs and with the peak output of 2,500 W by using the laser oscillator C2000 under basic conditions (D). In this case too, the minimum piercing time ranges from 5 to 6 seconds.

Figure 28:
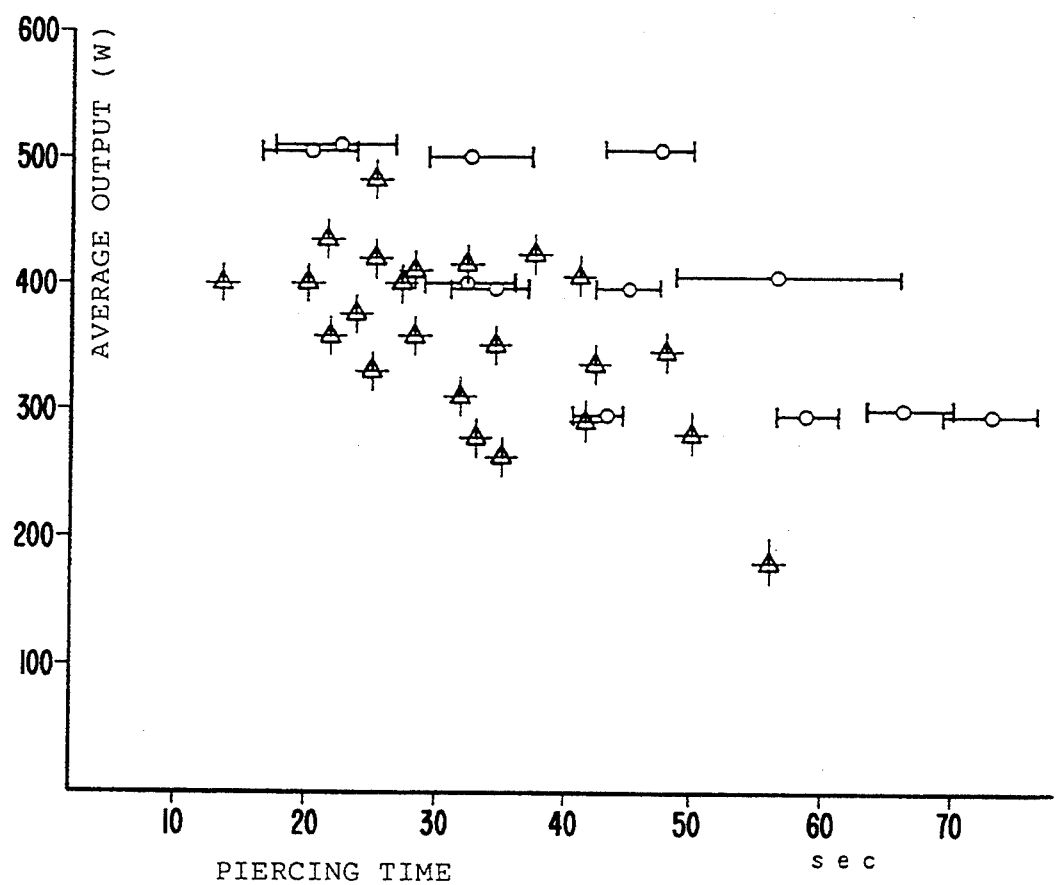

FIG. 28 shows the results of an experiment, in which a mild steel plate of 12-mm thickness was pierced with the peak output changed to 1,500 W among the following conditions shown in FIG. 26. In this case, the minimum processing time is 20 seconds or thereabouts.

Figure 29:
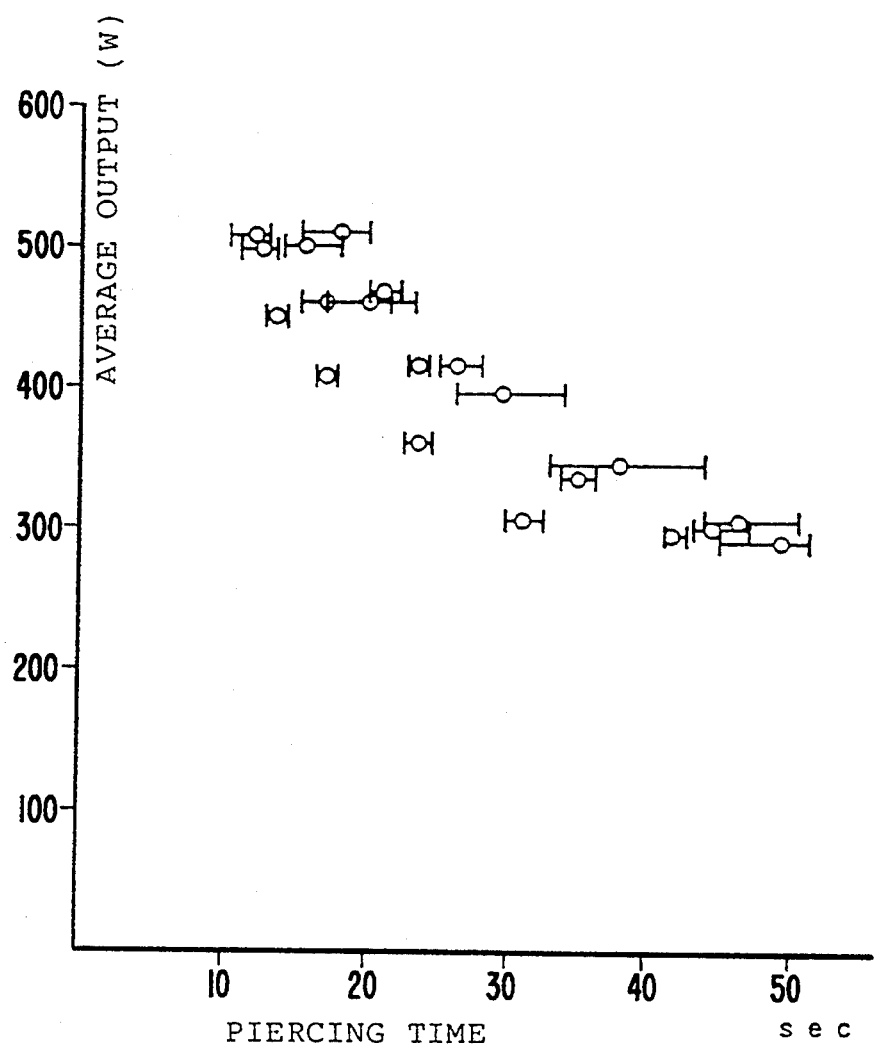

FIG. 29 shows the results of an experiment in which a mild steel plate of 12-mm thickness was pierced under the same conditions as the experiment of FIG. 27.

Figure 30:
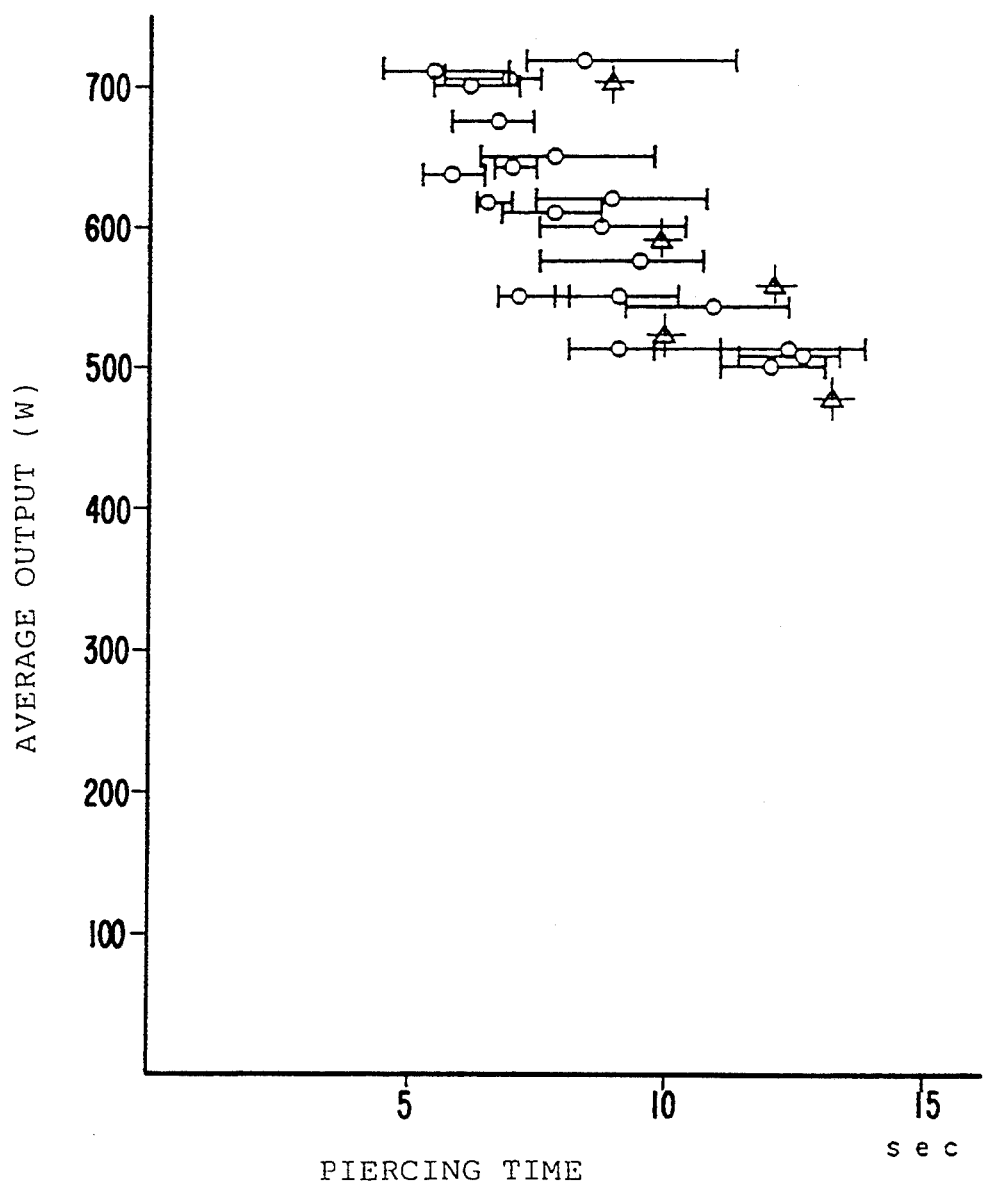

FIG. 30 shows the results of an experimental determination of the piercing time obtained when a mild steel plate of 12.0-mm thickness was processed with the peak output of 3,500 W by using the laser oscillator C3000 under the following basic conditions (E).

Figure 31:
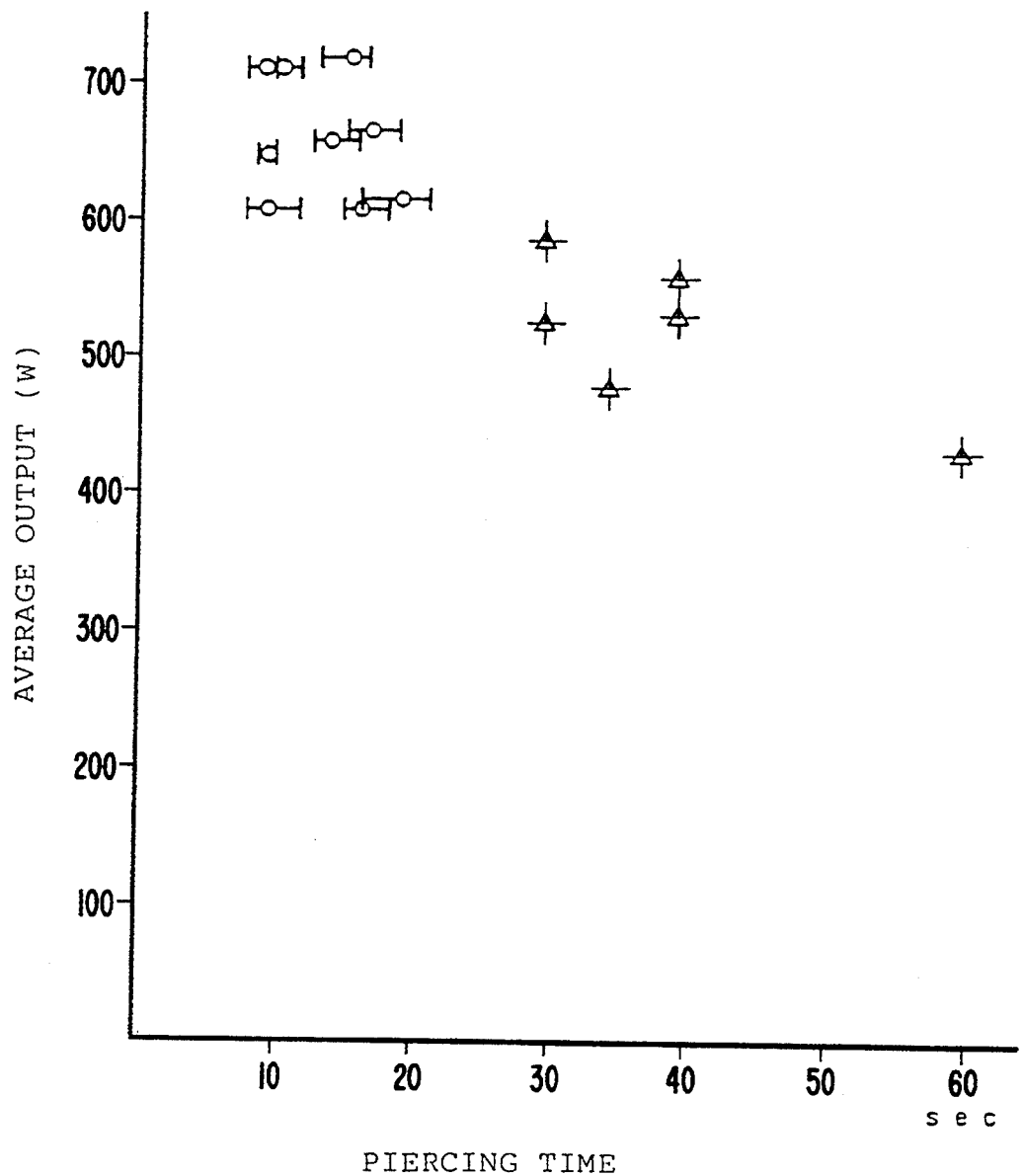

Basic conditions (E)
  Optical path length: about 6.0 m
  Focal distance of lens: 7.50 inches
  Nozzle stand-off: 2.0 mm
  Nozzle hole diameter: 3.0 mm
  Assist gas (oxygen) pressure: 0.10 kg/cm$^2$
  Focal position: cutting position FIG. 31 shows the results of an experimental determination of the piercing time obtained when a mild steel plate of 16.0-mm thickness was processed with the peak output of 3,500 W by using the laser oscillator C3000 under the following basic conditions (F).

Basic conditions (F)
  Optical path length: about 6.0 m
  Focal distance of lens: 7.50 inches
  Nozzle stand-off: 2.0 mm or 1.0 mm
  Nozzle hole diameter: 3.0 mm or 2.0 mm
  Assist gas (oxygen) pressure: 0.10 or 0.2 kg/cm$^2$
  Focal position: cutting position Table 3 shows the values of the individual parameters and their corresponding processing times obtained by the aforementioned experiments when processing was carried out attaching importance to the speed according to the conventional piercing method.

TABLE 3

| WORKPIECE THICKNESS (mm) | PEAK OUTPUT (W) | FREQUENCY (Hz) | DUTY (%) | AVERAGE OUTPUT (W) | PIERCING TIME (sec) |
| --- | --- | --- | --- | --- | --- |
| 6 | 1500 | 100 | 25 | 374 | 1.5 ± 0.5 |
| 9 | 1500 | 75 | 25 | 363 | 8.0 ± 1.0 |
|   | 2500 | 25 | 21 | 499 | 5.3 ± 0.5 |
| 12 | 1500 | 75 | 30 | 433 | 21.0 ± 2.0 |
|   | 2500 | 25 | 21 | 499 | 15.5 ± 2.0 |
|   | 3500 | 50 | 19 | 708 | 6.4 ± 1.0 |
| 16 | 2500 | 75 | 15 | 446 | 55.0 ± 5.0 |
|   | 3500 | 100 | 14 | 643 | 9.5 ± 3.0 |

As seen from Table 3, a mild steel plate of 6-mm thickness can be pierced in 1.5±0.5 seconds even when the importance is attached to speed; however, the piercing time of at least 5.3±0.5 seconds is required when the workpiece has thickness of 9 mm. When the peak output is 3,500 W, at least 6.4±1.0 seconds is required for the workpiece with thickness of 12 mm, and 9.5±3.0 seconds for the workpiece thickness of 16 mm.

Comparison between the processing times required according to the conventional piercing method shown in Table 3 and the processing times required according to the piercing method of the present invention shown in Table 2, in which importance is attached to the speed, indicates that the shorter processing times can be realized with the method of the present invention. Also, comparison between the conventional method and the standard piercing method of the present invention shown in Table 1 indicates that the piercing times according to the present invention are much shorter. In the case of standard use, in which a thermal runaway can be prevented, the piercing time according to the method of the present invention can be reduced to ⅓ to 1/5, as compared with the conventional method.

In performing the piercing operation according to the present invention, the NC laser processing apparatus is adjusted to set values of the peak output, initial pulse frequency $P_0$ at the start of processing, initial pulse duty ratio $Q_0$, pulse frequency increment P for each step, pulse duty ratio increment Q, time interval T for each step, and increase frequency (or increase time $T_1$) N for pulse frequency and pulse duty ratio, depending on the laser oscillator to be used, the workpiece thickness, and the style of use, that is, standard or speed-first. The processing is started with the initial pulse frequency $P_0$ and the initial pulse duty ratio $Q_0$; the predetermined pulse frequency increment P and pulse duty ratio increment Q are added with every passage of the predetermined time T; and the increase frequency is counted. Once the set increase number of times N is attained, the processing is continued until the processing is finished without changing the pulse frequency and the pulse duty ratio any further.

The aforementioned parameters may be manually set through the CRT/MDI 18 or preset in the processing program. After a table stored with the parameters $P_0$, $Q_0$, P, Q, T and N is previously stored in a nonvolatile memory or the like, depending on the processing mode, that is, high-speed or normal, as well as depending on the values of the workpiece thickness and the peak output, the processing mode, that is, high-speed or normal, is set, and the workpiece thickness and the peak output are set. Then, the respective values of these parameters are read from the table, and processing control is effected in accordance with the parameter values.

We claim:

1. A piercing method for laser processing, comprising the steps of:

starting a piercing operation with an initial pulse frequency and an initial pulse duty ratio;
   increasing the pulse frequency and the pulse duty ratio individually by predetermined increments with every passage of a first predetermined time during the piercing operation; and
   after the pulse frequency and the pulse duty ratio are increased a predetermined number of times, maintaining the pulse frequency and the pulse duty ratio at a certain level until the end of the piercing operation.

2. A piercing method for laser processing according to claim 1, wherein said initial pulse frequency, said initial pulse duty ratio, said first predetermined time, said increments of the pulse frequency and the pulse duty ratio, and said frequency of increase are changed depending on a thickness of a workpiece and a peak output of a laser.

3. A piercing method for laser processing according to claim 2, wherein said predetermined number of times ranges from 9 to 11 with the workpiece thickness ranging from 9 mm to 16 mm and the peak laser output from 2,500 W to 3,500 W.

4. A piercing method for laser processing according to claim 2, wherein said predetermined number of times ranges from 12 to 14 with the workpiece thickness ranging from 19 mm to 22 mm and the peak laser output from 2,500 W to 3,500 W.

5. A piercing method for laser processing according to claim 1, wherein said first predetermined time ranges from 300 msec to 500 msec.

6. A piercing method for laser processing according to claim 1, wherein said pulse frequency increment is 5 Hz.

7. A piercing method for laser processing according to claim 1, wherein said pulse duty ratio increment is 1%.

8. A piercing method for laser processing, comprising the steps of:
    starting a piercing operation with an initial pulse frequency and an initial pulse duty ratio;
    increasing the pulse frequency and the pulse duty ratio individually by predetermined increments with every passage of a first predetermined time during the piercing operation; and
    after a passage of a second predetermined time from the start of the piercing operation, maintaining the pulse frequency and the pulse duty at a certain level until the end of the piercing operation.

9. A piercing method for laser processing according to claim 8, wherein said initial pulse frequency, said initial pulse duty ratio, said predetermined time, said predetermined increments of the pulse frequency and the pulse duty ratio, and said second predetermined time are changed depending on a thickness of an object to be processed and a peak output of a laser.

10. A piercing method for laser processing according to claim 8, wherein said first predetermined time ranges from 300 msec to 500 msec.

11. A piercing method for laser processing according to claim 8, wherein said pulse frequency increment is 5 Hz.

12. A piercing method for laser processing according to claim 8, wherein said pulse duty ratio increment is 1%.

* * * * *

UNITED STATES PATENT AND TRADEMARK OFFICE
CERTIFICATE OF CORRECTION

PATENT NO. : 5,434,383
DATED : July 18, 1995
INVENTOR(S) : Yoshinoru Nakata, et. al.

It is certified that error appears in the above-indentified patent and that said Letters Patent is hereby corrected as shown below:

Title page, item [75], change "Oshino" to --Yamanashi--; change "Machida" to --Tokyo-; and change "Kitatsuru" to Yamanashi--.

Signed and Sealed this

Twenty-fourth Day of October, 1995

Attest:

BRUCE LEHMAN

Attesting Officer    Commissioner of Patents and Trademarks